United States Patent
Gray et al.

(10) Patent No.: US 8,286,203 B2
(45) Date of Patent: Oct. 9, 2012

(54) SYSTEM AND METHOD FOR ENHANCED HOT KEY DELIVERY

(75) Inventors: James Harold Gray, Ellijay, GA (US); Thomas Jefferson Brothers, Gainesville, GA (US); William Randolpoh Matz, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1511 days.

(21) Appl. No.: 10/742,700

(22) Filed: Dec. 19, 2003

(65) Prior Publication Data

US 2005/0138668 A1 Jun. 23, 2005

(51) Int. Cl.
*H04N 7/10* (2006.01)
*H04N 7/025* (2006.01)

(52) U.S. Cl. ............... 725/36; 725/34; 725/35; 725/51; 725/112; 725/136

(58) Field of Classification Search ............... 725/32–36, 725/112, 51, 136
See application file for complete search history.

(56) References Cited

U.S. PATENT DOCUMENTS

| | | |
|---|---|---|
| 3,798,610 A | 3/1974 | Bliss |
| 3,886,302 A | 5/1975 | Kosco |
| 4,130,833 A | 12/1978 | Chomet |
| 4,258,386 A | 3/1981 | Cheung |
| 4,264,925 A | 4/1981 | Freeman |
| 4,361,851 A | 11/1982 | Asip |
| 4,488,179 A | 12/1984 | Kruger |
| 4,566,030 A | 1/1986 | Nickerson |
| 4,567,591 A | 1/1986 | Gray |
| 4,573,072 A | 2/1986 | Freeman |
| 4,598,288 A | 7/1986 | Yarbrough |
| 4,688,248 A | 8/1987 | Tomizawa |
| 4,689,661 A | 8/1987 | Barbieri |
| 4,698,670 A | 10/1987 | Matty |
| 4,720,873 A | 1/1988 | Goodman |
| 4,816,904 A | 3/1989 | Mckenna |

(Continued)

FOREIGN PATENT DOCUMENTS

WO 9414284 6/1994

OTHER PUBLICATIONS

Advanced Television Enhancement Forum Specification (ATVEF), 1998, Draft Version 1.0r1, All Pages.*

(Continued)

*Primary Examiner* — Jason Salce
(74) *Attorney, Agent, or Firm* — Toler Law Group PC

(57) ABSTRACT

According to one embodiment, a service provider determines whether to inform one or more users of an interactive television service of available content. Responsive to determining to inform the one or more users of the available content, a hot key signal is generated. The hot key signal is sent to the users via a side channel out-of-band with one or more channels for content. The hot key signal from the out-of band side channel is received by a terminal device. The terminal device determines whether the hot key signal is relevant to a user currently viewing content from the service provider. Responsive to determining the hot key signal is relevant to the user, an indication that the hot key signal has been received is displayed. Responsive to receiving an indication that the hot key is accepted, the user is directed to the available content indicated by the hot key signal.

29 Claims, 13 Drawing Sheets

U.S. PATENT DOCUMENTS

| | | | |
|---|---|---|---|
| 4,862,268 A | 8/1989 | Campbell |
| 4,890,332 A | 12/1989 | Takahashi |
| 4,912,552 A | 3/1990 | Allison |
| 5,010,585 A | 4/1991 | Garcia |
| 5,010,858 A | 4/1991 | Schierling |
| 5,038,211 A | 8/1991 | Hallenbeck |
| 5,046,090 A | 9/1991 | Walker |
| 5,046,092 A | 9/1991 | Walker |
| 5,055,924 A | 10/1991 | Skutta |
| 5,161,019 A | 11/1992 | Emanuel |
| 5,173,900 A | 12/1992 | Miller |
| 5,181,438 A | 1/1993 | Wellman |
| 5,191,645 A | 3/1993 | Carlucci |
| 5,208,665 A | 5/1993 | McCalley |
| 5,247,347 A | 9/1993 | Litteral et al. |
| 5,249,044 A | 9/1993 | Von Kohorn |
| 5,260,778 A | 11/1993 | Kauffman et al. |
| 5,262,860 A | 11/1993 | Fitzpatrick |
| 5,287,181 A | 2/1994 | Holman |
| 5,335,277 A | 8/1994 | Harvey et al. |
| 5,339,315 A | 8/1994 | Maeda et al. |
| 5,343,240 A | 8/1994 | Yu |
| 5,357,276 A | 10/1994 | Banker |
| 5,374,951 A | 12/1994 | Welsh |
| 5,390,027 A | 2/1995 | Henmi et al. |
| 5,404,393 A | 4/1995 | Remillard |
| 5,444,499 A | 8/1995 | Saitoh |
| 5,446,490 A | 8/1995 | Blahut et al. |
| 5,446,919 A | 8/1995 | Wilkins |
| 5,481,542 A | 1/1996 | Logston et al. |
| 5,483,277 A | 1/1996 | Granger |
| 5,502,499 A | 3/1996 | Birch et al. |
| 5,539,451 A | 7/1996 | Carey et al. |
| 5,539,822 A | 7/1996 | Lett |
| 5,541,917 A | 7/1996 | Farris |
| 5,555,838 A | 9/1996 | Bergman |
| 5,557,320 A | 9/1996 | Krebs |
| 5,557,338 A | 9/1996 | Maze et al. |
| 5,585,838 A | 12/1996 | Lawler et al. |
| 5,585,858 A | 12/1996 | Harper et al. |
| 5,592,477 A | 1/1997 | Farris et al. |
| 5,592,551 A * | 1/1997 | Lett et al. ........................ 380/211 |
| 5,600,775 A | 2/1997 | King et al. |
| 5,608,448 A | 3/1997 | Smoral et al. |
| 5,629,733 A | 5/1997 | Youman |
| 5,640,192 A | 6/1997 | Garfinkle |
| 5,648,824 A | 7/1997 | Dunn et al. |
| 5,661,517 A | 8/1997 | Budow et al. |
| 5,721,829 A | 2/1998 | Dunn et al. |
| 5,779,549 A | 7/1998 | Walker et al. |
| 5,781,246 A | 7/1998 | Alten et al. |
| 5,784,683 A | 7/1998 | Sistanizadeh et al. |
| 5,796,426 A | 8/1998 | Gullichsen et al. |
| 5,805,154 A | 9/1998 | Brown |
| 5,818,438 A | 10/1998 | Howe |
| 5,822,123 A | 10/1998 | Davis |
| 5,828,420 A | 10/1998 | Marshall et al. |
| 5,847,771 A | 12/1998 | Cloutier et al. |
| 5,864,823 A | 1/1999 | Levitan |
| 5,867,205 A | 2/1999 | Harrison |
| 5,880,768 A | 3/1999 | Lemmons et al. |
| 5,880,769 A | 3/1999 | Nemirofsky et al. |
| 5,892,508 A | 4/1999 | Howe |
| 5,931,908 A | 8/1999 | Gerba |
| 5,977,964 A | 11/1999 | Williams |
| 5,990,927 A | 11/1999 | Hendricks |
| 6,005,561 A | 12/1999 | Hawkins et al. |
| 6,008,802 A | 12/1999 | Iki et al. |
| 6,012,983 A | 1/2000 | Walker et al. |
| 6,018,764 A | 1/2000 | Field et al. |
| 6,025,837 A | 2/2000 | Matthews |
| 6,100,883 A | 8/2000 | Hoarty |
| 6,108,042 A | 8/2000 | Adams et al. |
| 6,113,495 A | 9/2000 | Walker et al. |
| 6,144,402 A * | 11/2000 | Norsworthy et al. ......... 725/109 |
| 6,157,413 A | 12/2000 | Hanafee et al. |
| 6,201,536 B1 | 3/2001 | Hendricks et al. |
| 6,213,880 B1 | 4/2001 | Sim |
| 6,230,172 B1 | 5/2001 | Purnaveja et al. |
| 6,240,555 B1 | 5/2001 | Shoff et al. |
| 6,244,957 B1 | 6/2001 | Walker et al. |
| 6,256,785 B1 | 7/2001 | Klappert et al. |
| 6,317,885 B1 | 11/2001 | Fries |
| 6,324,544 B1 | 11/2001 | Alam et al. |
| 6,324,694 B1 | 11/2001 | Watts et al. |
| 6,327,574 B1 | 12/2001 | Kramer et al. |
| 6,349,410 B1 * | 2/2002 | Lortz ............................ 725/110 |
| 6,357,042 B2 | 3/2002 | Srinivasan et al. |
| 6,418,556 B1 | 7/2002 | Bennington et al. |
| 6,419,137 B1 | 7/2002 | Marshall et al. |
| 6,463,207 B1 | 10/2002 | Abecassis |
| 6,463,858 B2 | 10/2002 | Weber et al. |
| 6,468,155 B1 | 10/2002 | Zucker et al. |
| 6,477,579 B1 | 11/2002 | Kunkel et al. |
| 6,483,986 B1 * | 11/2002 | Krapf .............................. 386/68 |
| 6,502,242 B1 | 12/2002 | Howe |
| 6,535,889 B1 | 3/2003 | Headrick et al. |
| 6,557,006 B1 | 4/2003 | Headrick et al. |
| 6,567,982 B1 | 5/2003 | Howe |
| 6,615,408 B1 | 9/2003 | Kaiser et al. |
| 6,634,942 B2 | 10/2003 | Walker |
| 6,676,522 B2 | 1/2004 | Rowe |
| 6,701,437 B1 * | 3/2004 | Hoke et al. ....................... 726/15 |
| 6,718,551 B1 | 4/2004 | Swix |
| 6,738,978 B1 | 5/2004 | Hendricks |
| 6,756,997 B1 | 6/2004 | Ward et al. |
| 6,760,916 B2 | 7/2004 | Holtz |
| 6,800,029 B2 | 10/2004 | Rowe |
| 6,820,277 B1 * | 11/2004 | Eldering et al. ................. 725/35 |
| 6,826,775 B1 | 11/2004 | Howe |
| 6,850,252 B1 | 2/2005 | Hoffberg |
| 6,898,762 B2 | 5/2005 | Ellis |
| 6,967,566 B2 | 11/2005 | Weston |
| 7,100,183 B2 | 8/2006 | Kunkel et al. |
| 7,237,253 B1 | 6/2007 | Blackketter |
| 7,249,321 B2 | 7/2007 | Bushey |
| 7,266,832 B2 * | 9/2007 | Miller ............................. 725/34 |
| 7,266,835 B2 | 9/2007 | Halbert |
| 7,293,276 B2 | 11/2007 | Phillips |
| 7,302,696 B1 * | 11/2007 | Yamamoto ....................... 725/23 |
| 7,320,134 B1 | 1/2008 | Tomsen et al. .................. 725/32 |
| 7,337,457 B2 | 2/2008 | Pack |
| 7,634,787 B1 * | 12/2009 | Gebhardt et al. ................ 725/36 |
| 7,849,226 B2 | 12/2010 | Zigmond et al. |
| 2001/0054134 A1 | 12/2001 | Nagatomo et al. |
| 2002/0056093 A1 | 5/2002 | Kunkel et al. |
| 2002/0056129 A1 * | 5/2002 | Blackketter et al. .......... 725/112 |
| 2002/0059586 A1 * | 5/2002 | Carney et al. ................... 725/35 |
| 2002/0059644 A1 * | 5/2002 | Andrade et al. ............... 725/136 |
| 2002/0069132 A1 | 6/2002 | Perkes et al. |
| 2002/0083464 A1 * | 6/2002 | Tomsen et al. ................. 725/112 |
| 2002/0083469 A1 | 6/2002 | Jeannin et al. |
| 2002/0087402 A1 | 7/2002 | Zustak et al. |
| 2002/0138561 A1 | 9/2002 | Chatfield et al. |
| 2002/0147984 A1 * | 10/2002 | Tomsen et al. ................. 725/109 |
| 2002/0147988 A1 | 10/2002 | Nakano |
| 2002/0156870 A1 | 10/2002 | Boroumand |
| 2002/0162121 A1 * | 10/2002 | Mitchell ........................ 725/135 |
| 2003/0005437 A1 * | 1/2003 | Feuer et al. ..................... 725/34 |
| 2003/0018969 A1 | 1/2003 | Humpleman |
| 2003/0051238 A1 * | 3/2003 | Barone, Jr. ...................... 725/32 |
| 2003/0067554 A1 | 4/2003 | Klarfeld |
| 2003/0070167 A1 | 4/2003 | Holtz |
| 2003/0110171 A1 | 6/2003 | Ozer |
| 2003/0110499 A1 | 6/2003 | Knudson |
| 2003/0145323 A1 | 7/2003 | Hendricks |
| 2003/0149975 A1 | 8/2003 | Eldering |
| 2003/0163828 A1 | 8/2003 | Agnihotri |
| 2003/0182567 A1 | 9/2003 | Barton |
| 2003/0204847 A1 | 10/2003 | Ellis |
| 2003/0208754 A1 | 11/2003 | Sridhar |
| 2003/0233656 A1 * | 12/2003 | Sie et al. ......................... 725/46 |
| 2003/0235407 A1 | 12/2003 | Lord |
| 2004/0003402 A1 | 1/2004 | McKenna |
| 2004/0006509 A1 | 1/2004 | Mannik |
| 2004/0045028 A1 | 3/2004 | Harris |
| 2004/0049785 A1 | 3/2004 | Grzeczkowski et al. |

| | | |
|---|---|---|
| 2004/0098754 A1 | 5/2004 | Vella |
| 2004/0103032 A1 | 5/2004 | Maggio |
| 2004/0111742 A1 | 6/2004 | Hendricks |
| 2004/0122731 A1 | 6/2004 | Mannik |
| 2004/0163101 A1 | 8/2004 | Swix |
| 2004/0168188 A1 | 8/2004 | Bennington |
| 2004/0194138 A1 | 9/2004 | Boylan |
| 2004/0220858 A1 | 11/2004 | Maggio |
| 2004/0235567 A1 | 11/2004 | Chatani |
| 2004/0243470 A1 | 12/2004 | Ozer |
| 2004/0243623 A1 | 12/2004 | Ozer |
| 2004/0261127 A1 | 12/2004 | Freeman |
| 2005/0021403 A1 | 1/2005 | Ozer |
| 2005/0086688 A1 | 4/2005 | Omoigui |
| 2005/0091111 A1 | 4/2005 | Green |
| 2005/0097599 A1 | 5/2005 | Plotnick |
| 2005/0108776 A1 | 5/2005 | Carver |
| 2005/0114906 A1 | 5/2005 | Hoarty |
| 2005/0196139 A1 | 9/2005 | Blackketter |
| 2005/0204030 A1 | 9/2005 | Koch |
| 2005/0204385 A1 | 9/2005 | Sull |
| 2005/0216932 A1 | 9/2005 | Danker |
| 2005/0235318 A1 | 10/2005 | Grauch |
| 2005/0251820 A1 | 11/2005 | Stefanik |
| 2005/0262542 A1 | 11/2005 | DeWeese |
| 2005/0267809 A1 | 12/2005 | Zheng |
| 2005/0267810 A1 | 12/2005 | Zheng |
| 2005/0267820 A1 | 12/2005 | Zheng |
| 2006/0010476 A1 | 1/2006 | Kelly |
| 2006/0053049 A1 | 3/2006 | Nolan |
| 2006/0075430 A1 | 4/2006 | Park |
| 2006/0087987 A1 | 4/2006 | Witt |
| 2006/0190966 A1 | 8/2006 | McKissick et al. |
| 2006/0200842 A1 | 9/2006 | Chapman et al. |
| 2007/0067805 A1 | 3/2007 | Macrae et al. |
| 2007/0107035 A1 | 5/2007 | Howe et al. |
| 2007/0124763 A1 | 5/2007 | Ellis |
| 2007/0136773 A1 | 6/2007 | O'Neil |
| 2007/0155506 A1 | 7/2007 | Malik |
| 2007/0157235 A1 | 7/2007 | Teunissen |
| 2007/0168884 A1 | 7/2007 | Weeks |
| 2007/0186269 A1 | 8/2007 | Malik |
| 2007/0208766 A1 | 9/2007 | Malik |

OTHER PUBLICATIONS

Zap2it.com: "TV Listings Frequently Asked Questions", http://web.archive.org/web/20000903002526/www.zap2it.com/index/1,1146,4_1_0_000,FF.html.
Cauley,Leslie "Microsoft, Baby Bell Form Video Alliance", The Wall Street Journal, Sep. 26, 1994.
Chorianopoulos,Konstantinos, "The Digital Set-Top Box as a Virtual Channel Provider", Dept. of Management Science and Technology, Athens University of Economics Apr. 2003.
Dransfeld,Henning et al, "Interactive TV and Formula One a Strategic Issue for Engine Suppliers", European Business Review, 1999.
Droitcourt,J.L., "Understanding How Interactive Television Set-Top Box Works . . . and What it will Mean to the Customer", International Broadcasting Convention, Sep. 14-18, 1995.
Elmer-Dewitt,Phillip, "Ready for Prime Time?", Time Archive, Dec. 26, 1994.
Elmer-Dewitt,Phillip, "Play . . . Fast Forward . . . Rewind . . . Pause U.S. Firms Want to Wire America for Two-Way TV, but their Systems are Not Ready for Prime Time", Time Archive May 23, 1994.
Grant, Peter, "On-Demand TV Expands via Underused Fiber Highways", Wall Street Journal, Dec. 17, 2004.
Greenwald,John, "Battle for Remote Control", Time Archive, Mar. 1, 1995.
Hodge,Winston, "Architecture to Deliver Video on Demand", Electronic Business Buyer, Nov. 1994.
Jain, Sanjay K. et al, "Video on Demand: an Overview", A Central University, Feb. 2003.
Keough,Christopher, "Interactive TV Connection-Technology-Gold Pocket Interactive Acquires Mixed Signals Technologies", Los Angeles Business Journal, Mar. 4, 2002.

Leban,M. et al, "Internet Search for TV Content Based on TV Anytime", Sep. 22-24, 2003.
Lin, et al, "The Influence of Network Branding on Audience Affinity for Network Television", Advertising Research Foundation Feb. 2004.
Loizides, "Interactive TV: Dispelling Misconceptions in the Media", Acm Computers in Entertainment, vol. 3, No. 1, Article 7a, Jan. 2005.
Mermigas,Diane, "NBC Taking TV's Future by the Reins With On-Demand Content, Delivery", Television Week, Sep. 15, 2003.
Short,David, "A Quick Guide to Interactive Television", Broadcasting Engineering, Feb. 2005.
Srivastava,H.O., et al, "On-Line Broadcast Archives for Interactive Video", 1997.
Verhoeven,Jan L. et al, "System Architecture for Experimental Interactive Television", LogicaCMG Nederland B.V.
Waterman,David, "Internet TV: Business Models and Program Content", Dept. of Telecommunications Rradio and TV Center Sep. 2001.
"Building a Switched Broadcast network", Access Intelligence LLC Nov. 16, 2005.
"Building Dynamic Content for Set-Top Boxes", Sun Microsystems 1994-2005.
"Building the Perfect on Demand Beast: Television on Demand Presents a Dizzyling Array of Technology Options", Reed Business Information Nov. 3, 2003.
"Chips: Motorola's Scorpion Chip Turns TV Info Interactive Information Appliance", Work Group Computing Report Aug. 11, 1997.
"Columbia Tri-Star Television Distribution and Microsoft Sponsor Development Competition for Interactive Television", Microsoft Press Pass Jan. 25, 2000.
"EnReach Technology, Inc. Demonstrates Next Generation of Interactive Television with Innovative Open PVR Solution", EnReach Technology, Inc., PRNewswire.com, Sep. 1996-2006.
"Enter Video-on-Demand", Electronic News Aug. 31, 1998.
"Liberate Technologies Completes Assessment Aboard Scientific-Atlanta Explorer Set Tops and Digital Interactive Network", Liberate Technologies Press May 2, 2002.
"Next-Generation Digital Video Network; Intelligent IP Infrastructure Solutions for Cable Operators Offering VoD Services", Reed Business Information Feb. 2004.
"PBS Debuts Another First in Interactive Television; Wavexpress Selected to Provide Digital Broadcasting Platform", Market Wire Feb. 28, 2001.
"PENTV: BBC Achieves Significant Interactive TV Audiences with Open TV", Aug. 13, 2001.
"Set-Top Survival", Electronics Weekly May 22, 2002.
"Successfully Marketing Television on Demand: Operators, Programmers Look to Drive VOD Usage Through Promotions, Improved Navigation", Reed Business Information ISSN: 00072028, Nov. 22, 2004.
"Time Warner Introduces World's First Full Service Network in Orlando: Network offers First Digital Interactive Service Including Movies on Demand, Home Shopping and Interactive Games", Business Wire Dec. 14, 1994.
"Video on the Move", Reed Business Information Aug. 14, 2000.
"Worldgate Set to Deliver Go TV Links for Dynamic Interactive TV", Advanstar Communications, Inc., Oct. 22, 2002.
"http://www.nintendo.com/consumer/downloads/wave_english.pdf".
Berkowitz,Ben "Developers Interactinv With Sony Set-Top Box", Cable Worlds May 21, 2001.
Bissell, R.A. et al "The Set-Top Boxes for Interactive Services", BT Technology J., vol. 13, No. 4, Oct. 1995.
Carey,John "Contents and Service for the New Digital TV Environment".
Zollman,Peter M. "Interactive Television".
Knightrider TV Intro Theme, IMDb.com, Inc.

* cited by examiner

SYSTEM AND METHOD FOR ENHANCED HOT KEY DELIVERY

RELATED APPLICATIONS

This application is related to co-pending application Ser. No. 10/611,259 filed on Jun. 30, 2003.

FIELD OF THE INVENTION

The various embodiments of the invention disclosed herein relate generally to the field of interactive television. More particularly, these embodiments relate to providing enhanced delivery of content notification signals.

BACKGROUND OF THE INVENTION

Advances in telecommunications and computing technology have lead to the use of interactive television (TV) services on a large scale. Where such services are available, subscribers are not only able to access television content by passively receiving it, but are also able to interact with the service providers by communicating requests and/or commands to the service providers.

Generally, interactive TV service provides a subscriber or user a variety of options such as: traditional broadcast and cable television programming; video services, such as pay-per-view (PPV), near video-on-demand (NVOD), video-on-demand (VOD), promo channels, electronic program guides, etc.; cable delivered PC-based services; and interactive services through the use of a combination of compression and digital video technologies. Interactive TV services may also provide menuing capabilities and upstream signaling from subscribers to service providers.

In addition to various forms of video content, an interactive TV subscriber may be able to download video games or even play them interactively with an interactive server and/or with other subscribers. An interactive service subscriber may order "time shift TV," in which a particular program may be viewed at a time following its ordinary broadcast time. A subscriber may also selectively view desired parts of transactional, informational or advertising services. For example, a subscriber may view information on the weather predictions for a given location or at a given time, gather information relating to a particular sporting event or team, obtain news on demand, or query a system regarding a particular real estate market. Alternatively, a subscriber may participate in interactive entertainment programs, such as interactive game shows, interactive lottery or gambling, or request musical selections. Subscribers interested in educational programming, such as a school or a family residence, may invoke interactive "edutainment" or "how-to" programs.

The combination of broadcast and interactive applications over interactive TV (e.g., interactive content) creates a possible mode of communication in which a user, if informed of the availability of alternate interactive content relating to a subject matter of interest, may invoke the alternate content to investigate that subject matter more thoroughly and according to his or her own tastes. However, television viewers, who are accustomed to choosing at will between the available broadcast channels with instantaneous results, will expect to be informed of the alternate content in a convenient and timely manner and to pass from one medium to another seamlessly.

SUMMARY OF THE INVENTION

A method and apparatus are described that provide enhanced hot key delivery. According to one embodiment, a service provider determines whether to inform one or more users of an interactive television service of available content. Responsive to determining to inform the one or more users of the available content, a hot key signal is generated indicating availability and a location of the alternate content. The hot key signal is sent to the one or more users via a side channel with which the one or more users and the interactive television service provider are connected. The side channel is out-of-band with one or more channels for content.

The hot key signal from the out-of band side channel is received by a terminal device. The terminal device determines whether the hot key signal is relevant to a user currently viewing content from the service provider. Responsive to determining the hot key signal is relevant to the user, an indication that the hot key signal has been received is displayed. Responsive to receiving an indication that the hot key is accepted, the user is directed to the available content indicated by the hot key signal.

Other features of the present invention will be apparent from the accompanying drawings and from the detailed description that follows.

DETAILED DESCRIPTION OF THE INVENTION

In the following description, for the purposes of explanation, numerous specific details are set forth in order to provide a thorough understanding. It will be apparent, however, to one skilled in the art that embodiments of the present invention may be practiced without some of these specific details.

Embodiments of the present invention include various processes, which will be described below. The processes may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Embodiments of the present invention may be provided as a computer program product which may include a machine-readable medium having stored thereon instructions which may be used to program a computer (or other electronic devices) to perform a process. The machine-readable medium may include, but is not limited to, floppy diskettes, optical disks, Compact Disk Read-Only Memories (CD-ROMs), and magneto-optical disks, Read-Only Memories (ROMs), Random Access Memories (RAMs), Erasable Programmable Read-Only Memories (EPROMs), Electronically Erasable Programmable Read-Only Memories (EEPROMs), magnetic or optical cards, flash memory, or other type of media/machine-readable medium suitable for storing electronic instructions. Moreover, embodiments of the present invention may also be downloaded as a computer program product, wherein the program may be transferred from a remote computer to a requesting computer by way of data signals embodied in a carrier wave or other propagation medium via a communication link (e.g., a modem or network connection).

FIGS. 1A-1D illustrate a television displaying a picture containing a hot key for informing a subscriber of available alternate content and redirecting the subscriber to the alternate content responsive to selection of the hot key according to one embodiment of the present invention. These figures represent respectively a process of viewing content, receiving a hot key, accepting a hot key, and redirecting to alternate content.

Figure 1A:
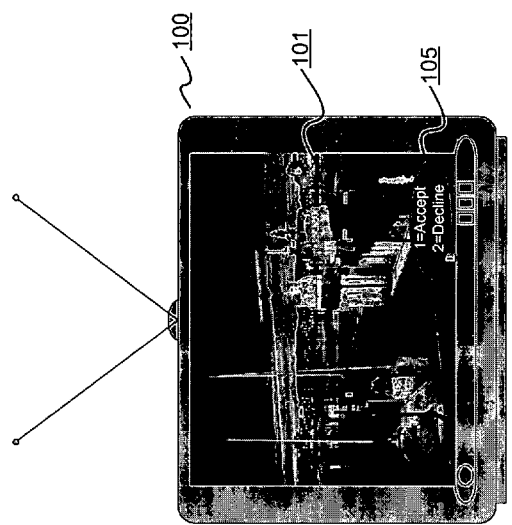
FIGS. 1A-1D illustrate a television displaying a picture containing a hot key for informing a subscriber of available alternate content and redirecting the subscriber to the alternate content responsive to selection of the hot key according to one embodiment of the present invention.

Specifically, FIG. 1A illustrates an example of viewing content. Here, a broadcast video program 101 is being displayed on television 100. Alternatively, a subscriber may be viewing other types of interactive TV content such as pay-per-view video content, interactive games, etc.

Figure 1B:
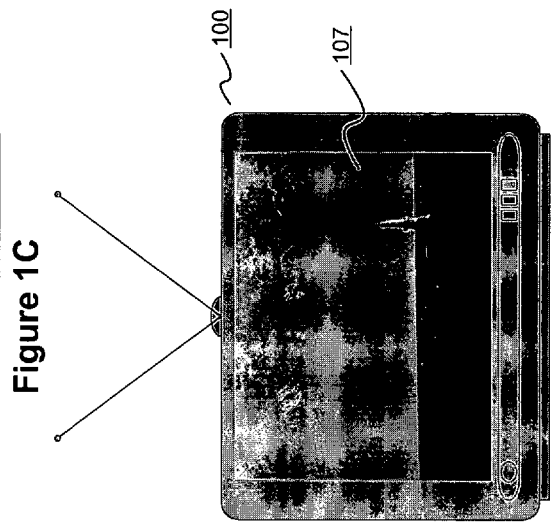

FIG. 1B illustrates an example of receiving a hot key. In this example, the subscriber is tuned to the same broadcast video program 101 on television 100 as in the previous example of FIG. 1A. However, in this example an icon 103 or other graphic has been displayed to indicate to the subscriber that a hot key has been received. The hot key indicates that alternate content is available for the subscriber's consumption. According to one embodiment of the present invention, the alternate content may be in the form of another broadcast video program with content related to the broadcast video program 101 being viewed by the subscriber.

Figure 1C:
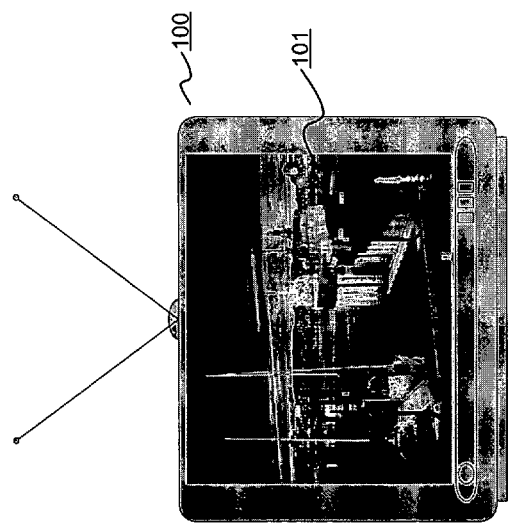

FIG. 1C illustrates an example of accepting a hot key. In this example, the subscriber is tuned to the same broadcast video program 101 as in FIGS. 1A and 1B. Icon 105, displayed to indicate to the subscriber that a hot key has been received, now indicates a manner in which the subscriber may accept or decline the alternate content. In this example, icon 105 indicates that the subscriber may press 1 to accept the alternate content or 2 to decline the alternate content.

Of course, other methods of accepting or declining the alternate content may be used. For example, different single or even multiple buttons on a remote control may be pressed by the subscriber to accept or decline the alternate content. According to one embodiment, a single "hot key button" may be present on the subscriber's remote control that may be pressed by the subscriber whenever a hot key icon is present on the television display. Pressing the hot key button may be a manner in which the subscriber accepts the alternate content and is redirected to that content without further interaction from the subscriber. According to another embodiment, the user may decline the alternate content by taking no action at all. That is, after some time period during which no action is taken by the subscriber to accept the alternate content, the hot key may simply time out and expire. Various other methods of accepting or declining the alternate content may also be used.

Figure 1D:
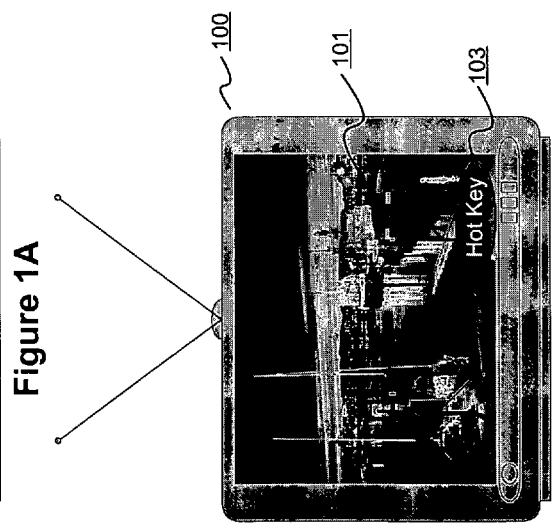

Regardless of the exact operation used to accept the alternate content, FIG. 1D illustrates redirecting a subscriber to alternate content responsive to the hot key being accepted. According to one embodiment of the present invention, the alternate content may be another broadcast video program with content related to the broadcast video program 101 being viewed by the subscriber. Therefore, television 100 in FIG. 1D illustrates an alternate video program 107 being displayed. According to one embodiment of the present invention, the alternate video program 107 may present content related to the original content the subscriber was viewing. For example, if the subscriber was viewing a broadcast television program related to travel, the alternate video program may also be related to travel.

According to yet another embodiment of the present invention, the alternate video program may be commercial in nature. For example, the broadcast television program may be related to sports. In such a case, the alternate video program may be a pay-per-view sporting event of the same type or an advertisement for an upcoming pay-per-view event. In another example, the alternate video program may be an "infomercial" selling merchandise related to some aspect of the original broadcast video.

Therefore, content providers and/or service providers may be able to sell hot keys just as they currently sell time for commercial spots. For example, a provider of pay-per-view video content may wish to purchase from a content provider a hot key that redirects subscribers to his content or an advertisement of upcoming events during a broadcast television program related to that content. Alternatively, content providers may charge subscribers to receive a hot key service or even to block some or all hot key signals. Content providers and/or service providers may thus be able to realize an additional source of revenue.

As will be described below, a system over which interactive television signals with associated hot key may be broadcast according to various embodiments of the present invention may be implemented over different types of networks. These different types of networks include, but are not limited to, cable, satellite, Fiber-to-the-Curb (FTTC), Fiber-to-the-House (FTTH), Very high speed Digital Subscriber Line (VDSL), and others. Also, if an out-of-band side channel used to transmit the hot key signal is through a network separate from the network transmitting the content, these networks may be of different types and use different mediums.

Figure 2:
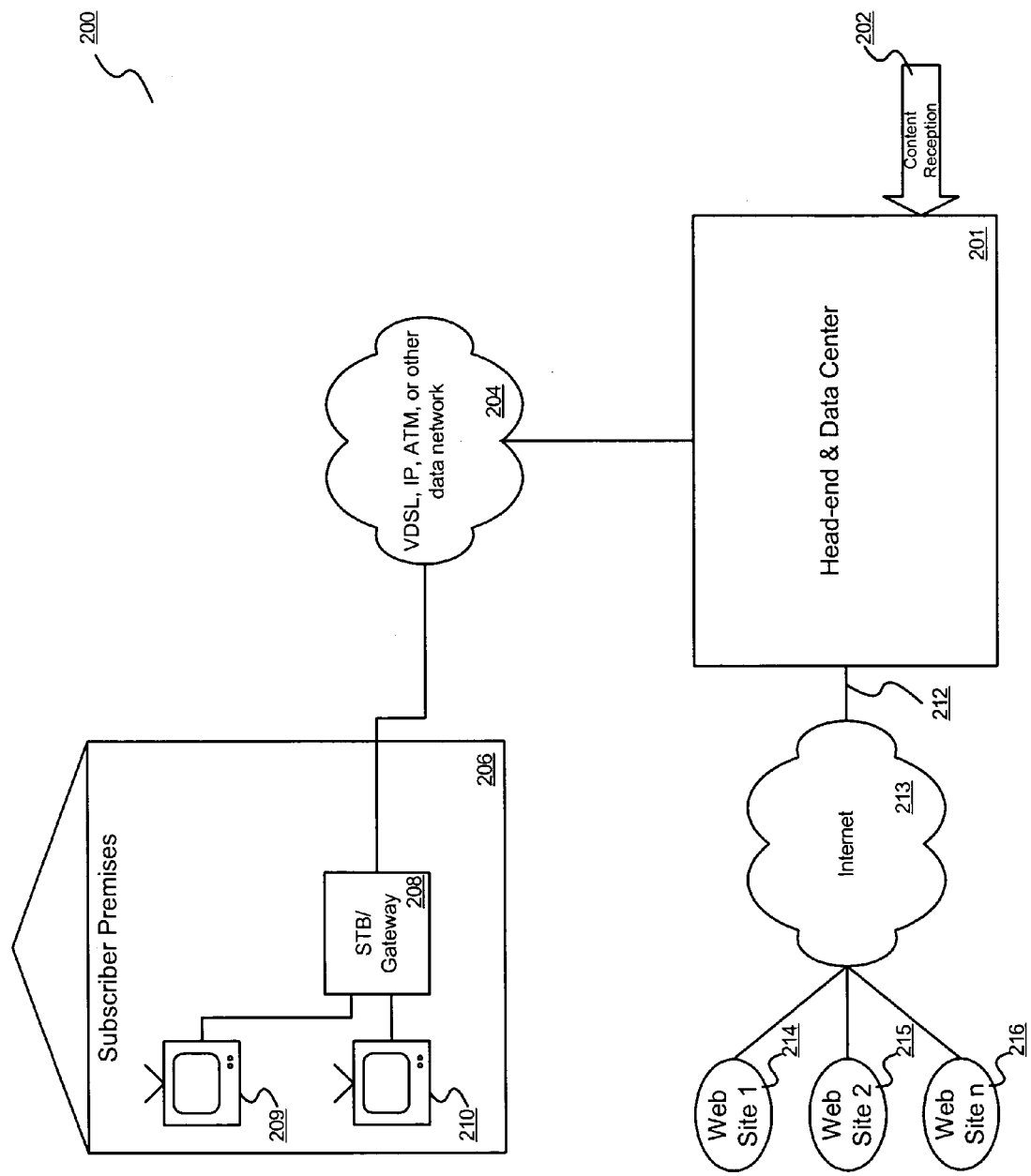
FIG. 2 is a block diagram illustrating an exemplary network over which interactive television signals and related hot key signals may be broadcast according to one embodiment of the present invention.

FIG. 2 is a block diagram illustrating an exemplary network over which interactive television signals and related hot key signals may be broadcast according to one embodiment of the present invention. This example illustrates, at a high-level, an architecture of a service provider's system 200 that includes head-end and data center 201, data network 204, and subscriber premises 206 that also contains cable modem 207, Set Top Box (STB)/Gateway 208, one or more televisions 209 and 210, and possibly other devices such as a personal computer (PC) (not shown here).

An interactive TV service provider typically operates and maintains a head-end and data center 201 equipped to receive signals 202 from one or more content providers. Content providers may be any original or secondary source of programming or information generally including, for example, interactive or non-interactive over-the-air programming such as commercial television stations, cable programming such as weather, travel and entertainment channels, game channels, and other interactive services of various types. Head-end and data center 201, after receiving content from one or more content providers, may then broadcast the interactive content to subscribers premises 206. Further details of the hardware comprising the head-end and data center 201 as well as the processing performed therein will be discussed below with reference to FIGS. 5 and 8.

According to one embodiment of the present invention, hot key signals indicating the availability of alternate content may be provided to head-end and data center 201 along with interactive TV signals 202 from the content providers. For example, the hot key signals may be generated at the content provider's location by an operations team when preparing and scheduling content for transmission to various service providers. As will be discussed below, interactive TV signals with these associated hot key signals are transmitted from head-end and data center 201 and are received and used by STB/gateway 208 or PC 211 at subscriber premises 206 to inform the subscriber of the availability of alternate content and to guide the subscriber to this content if he chooses to accept it. Details of the hot key signals will be discussed below with reference to FIG. 9.

According to another embodiment of the present invention, hot key signals indicating the availability of alternate content may be generated at head-end and data center 201. For example, the hot key signals may be generated at head-end and data center 201 by an operations team when preparing and scheduling content for transmission to subscribers. As will be discussed below, these associated hot key signals are transmitted from head-end and data center 201 and are received and used by STB/gateway 208 at subscriber premises 206 to inform the subscriber of the availability of alternate content and to guide the subscriber to this content if he chooses to accept it.

In the example illustrated in FIG. 2, a signal carrying interactive TV content is transmitted from head-end and data center 201 through data network 204. Data network 204 may be any of a variety of possible network types such as Very high speed Digital Subscriber Line (VDSL), Internet Protocol (IP), Asynchronous Transfer Mode (ATM), or others. The content may be broadcast as a Motion Pictures Experts Group Standard 2 (MPEG-2) data stream using a network protocol such as Internet Protocol (IP). Therefore, the content may be transmitted from head-end and data center 201 as IP data packets or in another similar format. One possible example of such a packet will be discussed below with reference to FIG. 9.

Regardless of the format of the transmission, a signal carrying the interactive TV content is received at subscriber premises 206 via STB/Gateway 208. The STB/Gateway 208 performs functions such as exchanging messages (including video-related data) over a network with head-end and data center 201, receiving messages from a user input device, such as a hand-held remote control unit or keyboard, translating video signals from a network-native format into a format that can be used by televisions 209 and 210 or other display devices, and providing a video signal to televisions 209 and 210 or other display devices. STB/Gateway 208 may also be capable of performing other functions, such as inserting alphanumeric or graphical information into the video stream in order to "overlay" that information on the video image, providing graphic or audio feedback to a user, or routing a traditional broadcast signal to a viewing device to which another STB is connected. Additional details of the hardware of STB/Gateway 208 and the processing performed therein will be discussed below with reference to FIGS. 10 and 13.

In use, STB/Gateway 208 may receive hot key signals associated with the interactive TV signals by either the content providers or the service provider. STB/Gateway 208 may then notify the subscriber of available alternate content as discussed above with reference to FIG. 1. STB/Gateway 208 may then receive some form of subscriber feedback indicating that the subscriber accepts or declines the alternate content. If the subscriber accepts the alternate content, STB/Gateway 208 may then redirect the subscriber to this alternate content as will be discussed further below with reference to FIG. 13.

According to one embodiment of the present invention, head-end and data center may also be connected with the Internet 213 or other network via a high-speed connection 212 such as a fiber optic connection to provide access to a number of web sites 214-216. Through this connection 212, head-end and data center 201 may supply alternate content to subscribers from one or more of the number of web sites 214-216.

Figure 3:
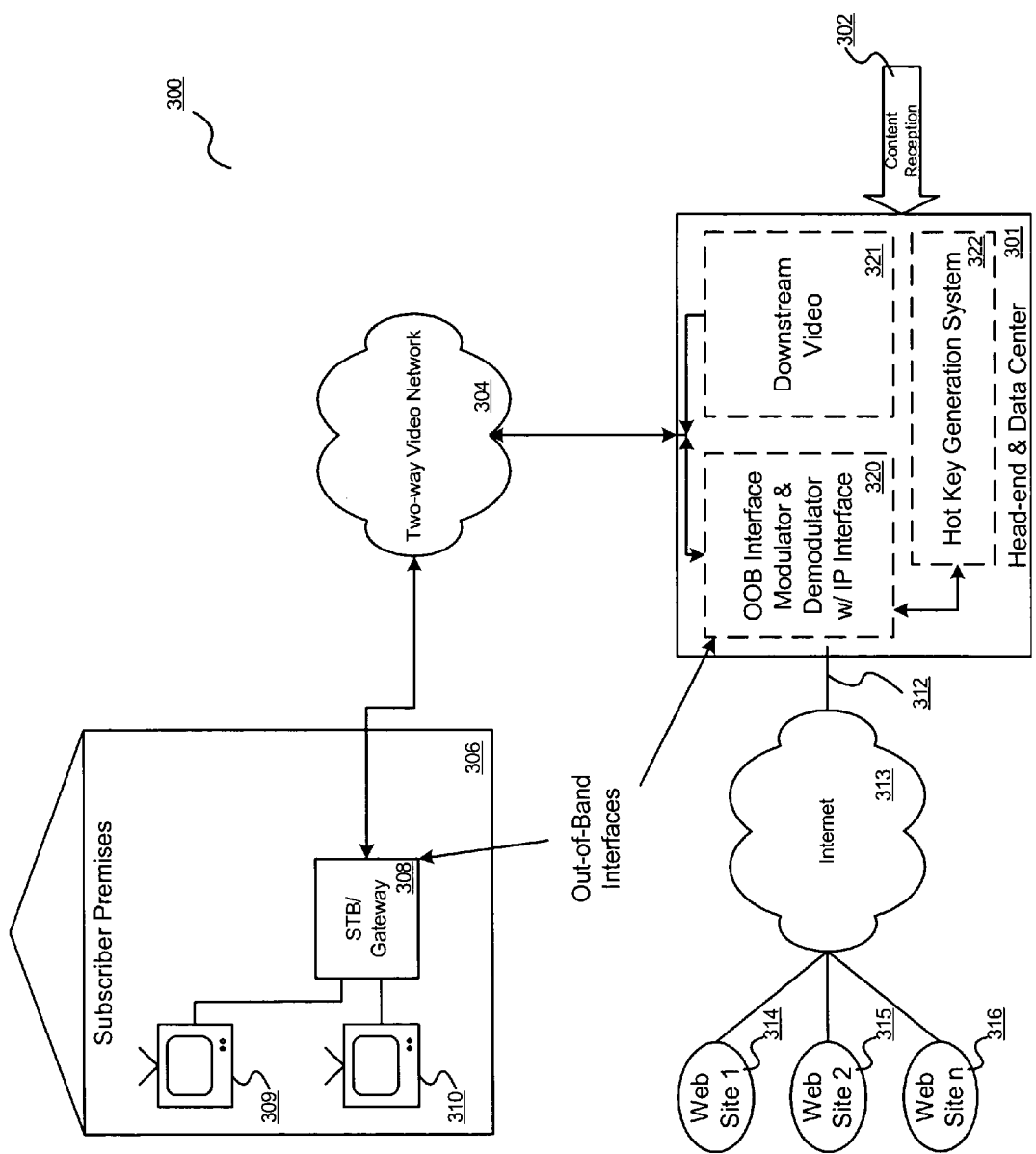
FIG. 3 is a block diagram illustrating an exemplary network over which interactive television signals and related hot key signals may be broadcast according to an alternative embodiment of the present invention.

FIG. 3 is a block diagram illustrating an exemplary network over which interactive television signals and related hot key signals may be broadcast according to an alternative embodiment of the present invention. As will be explained, this example uses a two-way video network with Out-of-Band (OOB) interfaces at both the head-end and at the STB to provide for the transfer of hot-key signals. FIG. 3 illustrates, at a high-level, an architecture of a service provider's system 300 that includes head-end and data center 301, two-way video network 304, and subscriber premises 306 that also contains Set Top Box (STB)/Gateway 308, one or more televisions 309 and 310, and possibly other devices such as personal computer (PC) (not shown here).

As explained above, an interactive TV service provider typically operates and maintains a head-end and data center 301 equipped to receive signals 302 from one or more content providers. Head-end and data center 301 receives the content from one or more content providers and may then broadcast the interactive content via downstream video module 321 to subscriber's premises 306.

According to one embodiment of the present invention, hot key signals indicating the availability of alternate content may be provided to head-end and data center 301 along with the content signals 302 from the content providers. For example, the hot key signals may be generated at the content provider's location by an operations team when preparing and scheduling content for transmission to various service providers. In such a case, the hot key generation system 322 detects the hot key signals from the content providers and the signals to the OOB interface 320 to send the hot key signals to the subscriber's premises via an out-of-band channel of the two-way video network 304. Alternatively, hot key generation system 322 may generate hot key signals at the head-end and data center 301 independently. Further details of the hardware comprising the head-end and data center 301 as well as the processing performed therein will be discussed below with reference to FIGS. 6 and 8.

As will be discussed below, interactive TV signals and the associated hot key signals are transmitted from head-end and data center 301 and are received and used by STB/gateway 308 at subscriber premises 306 to inform the subscriber of the availability of alternate content and to guide the subscriber to this content if he chooses to accept it. Details of the hot key signals will be discussed below with reference to FIG. 9.

In the example illustrated in FIG. 3, a signal carrying interactive TV content is transmitted from head-end and data center 301 over two-way video network 304. Typically, transmissions over two-way video network 304 may be made in a digital form. For example, the content may be broadcast as a Motion Pictures Experts Group Standard 2 (MPEG-2) data stream using a network protocol such as Internet Protocol (IP). Therefore, the content and hot key signals may be transmitted from head-end and data center 301 as IP data packets or in another similar format. One possible example of such a packet will be discussed below with reference to FIG. 9.

Regardless of the format of the transmission, a signal carrying the interactive TV content is received at subscriber premises 306 via STB/Gateway 308. Additional details of the hardware of STB/Gateway 308 and the processing performed therein will be discussed below with reference to FIGS. 11 and 13.

In use, STB/Gateway 308, containing an out-of-band interface, may receive hot key signals from either the content providers or the service provider and transmitted to the STB/Gateway 308 from the head-end and data center 301 via an out-of-band side channel. STB/Gateway 308 may then notify the subscriber of available alternate content as discussed above with reference to FIG. 1. STB/Gateway 308 may then receive some form of subscriber feedback indicating that the subscriber accepts or declines the alternate content. If the subscriber accepts the alternate content, STB/Gateway 308 may then redirect the subscriber to this alternate content as will be discussed further below with reference to FIG. 13.

According to one embodiment of the present invention, head-end and data center 301 may also be connected with the Internet 313 or other network via a high-speed connection 312 such as a fiber optic connection to provide access to a number of web sites 314-316. Through this connection 312, head-end and data center 301 may supply alternate content to subscribers from one or more of the number of web sites 314-316.

Figure 4:
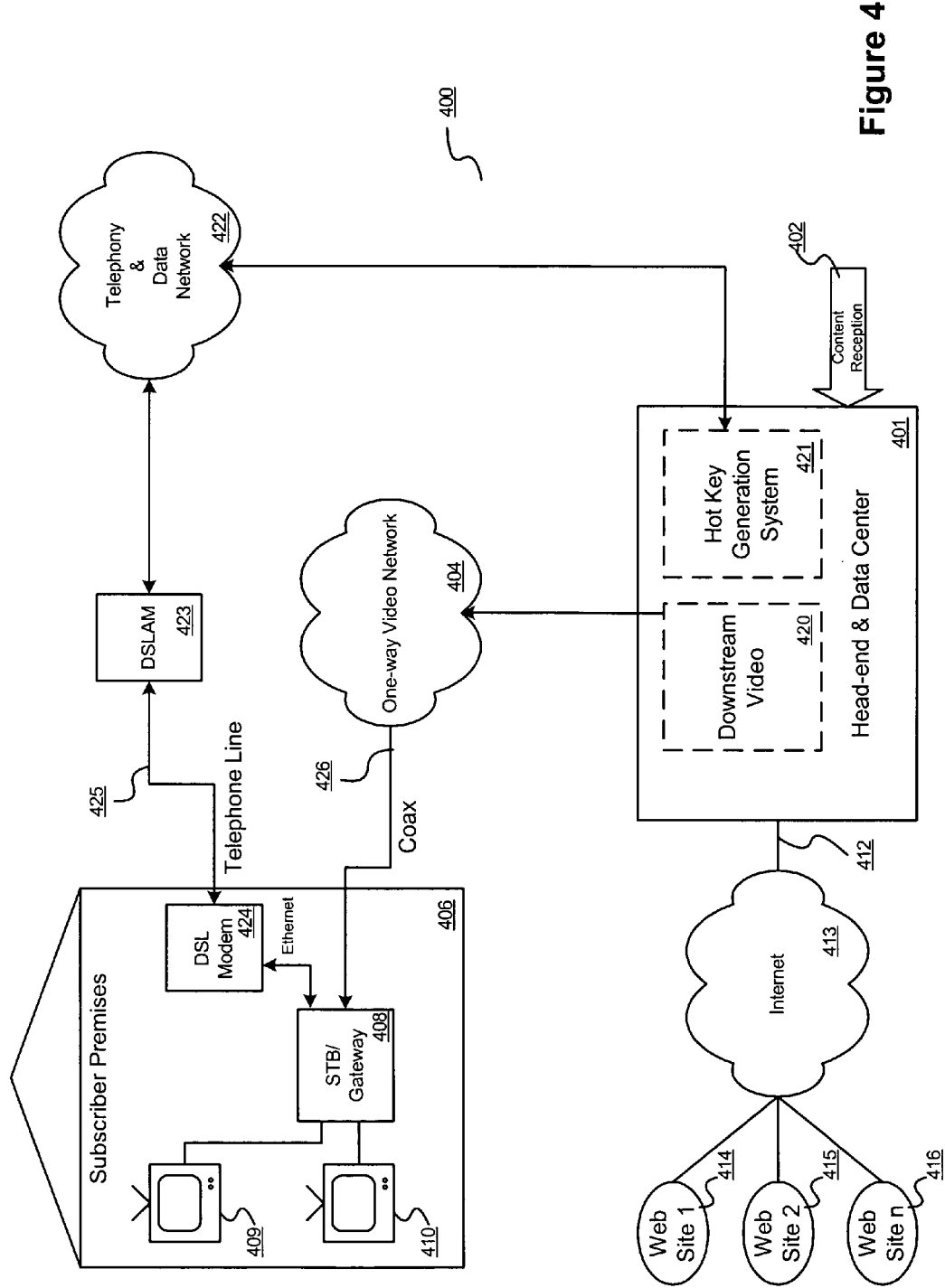
FIG. 4 is a block diagram illustrating an exemplary network over which interactive television signals and related hot key signals may be broadcast according to another alternative embodiment of the present invention.

FIG. 4 is a block diagram illustrating an exemplary network over which interactive television signals and related hot key signals may be broadcast according to another alternative embodiment of the present invention. As will be explained, this example uses a one-way video network and a separate Digital Subscriber Line (DSL) connection over a telephony network between the head-end and the subscriber's premises to provide for the transfer of hot-key signals. FIG. 4 illustrates, at a high-level, an architecture of a service provider's system 400 that includes head-end and data center 401, one-way video network 404, and subscriber premises 406 that also contains cable modem 407, Set Top Box (STB)/Gateway 408, one or more televisions 409 and 410.

Head-end and data center 401, after receiving content from one or more content providers, may then broadcast the interactive content to subscribers premises 406 from downstream video module 420 over one-way video network 404. According to one embodiment of the present invention, hot key signals indicating the availability of alternate content may be provided to head-end and data center 401 along with the content signals 402 from the content providers. In such a case, the hot key signals may be detected by hot key generation system 421. The hot key signals may then be transmitted from head-end and data center 401 over telephony and data network 422. These signals are received by DSL modem 424 connected with STB/gateway 408 at subscriber premises 406.

Alternatively, hot key signals indicating the availability of alternate content may be independently generated by hot key generation system 421 at head-end and data center 401. For example, the hot key signals may be generated at head-end and data center 401 by an operations team when preparing and scheduling content for transmission to subscribers. Further details of the hardware comprising the head-end and data center 401 as well as the processing performed therein will be discussed below with reference to FIGS. 7 and 8.

A signal carrying the video portion of the interactive TV content is received at subscriber premises 406 via STB/Gateway 408 over coax cable 426. The hot key signals, whether generated by the content provider or the head-end and data center 401 are received by DSL modem 424 connected with telephone line 425 and Digital Subscriber Line Access Multiplexor (DSLAM) 423.

DSLAM 423 is a device that is located in the central office or in the field and is operated by the entity providing the telephony and data network 422. The DSLAM 423 provides communication between the subscribers DSL modem 424 and the telephony and data network 422. The service provider may use ATM or some other wide area network protocol to transport the data from all users on a DSLAM to its destination. So one side of the DSLAM 423 accepts a wide area network protocol (that aggregates the data from all the users on the DSLAM), and the other side connects to a DSL modem in each home over the copper phone lines.

In use, STB/Gateway 408 receives hot key signals from the DSL modem 424 via a network connection such as an Ethernet connection. STB/Gateway 408 may then notify the subscriber of available alternate content as discussed above with reference to FIG. 1. STB/Gateway 408 may then receive some form of subscriber feedback indicating that the subscriber accepts or declines the alternate content. If the subscriber accepts the alternate content, STB/Gateway 408 may then redirect the subscriber to this alternate content. Additional details of the hardware of STB/Gateway 408 and the processing performed therein will be discussed below with reference to FIGS. 12 through 13.

According to one embodiment of the present invention, head-end and data center 401 may also be connected with the Internet 413 or other network via a high-speed connection 412 such as a fiber optic connection to provide access to a number of web sites 414-416. Through this connection 412, head-end and data center 401 may supply alternate content to subscribers from one or more of the number of web sites 414-416.

Figure 5:
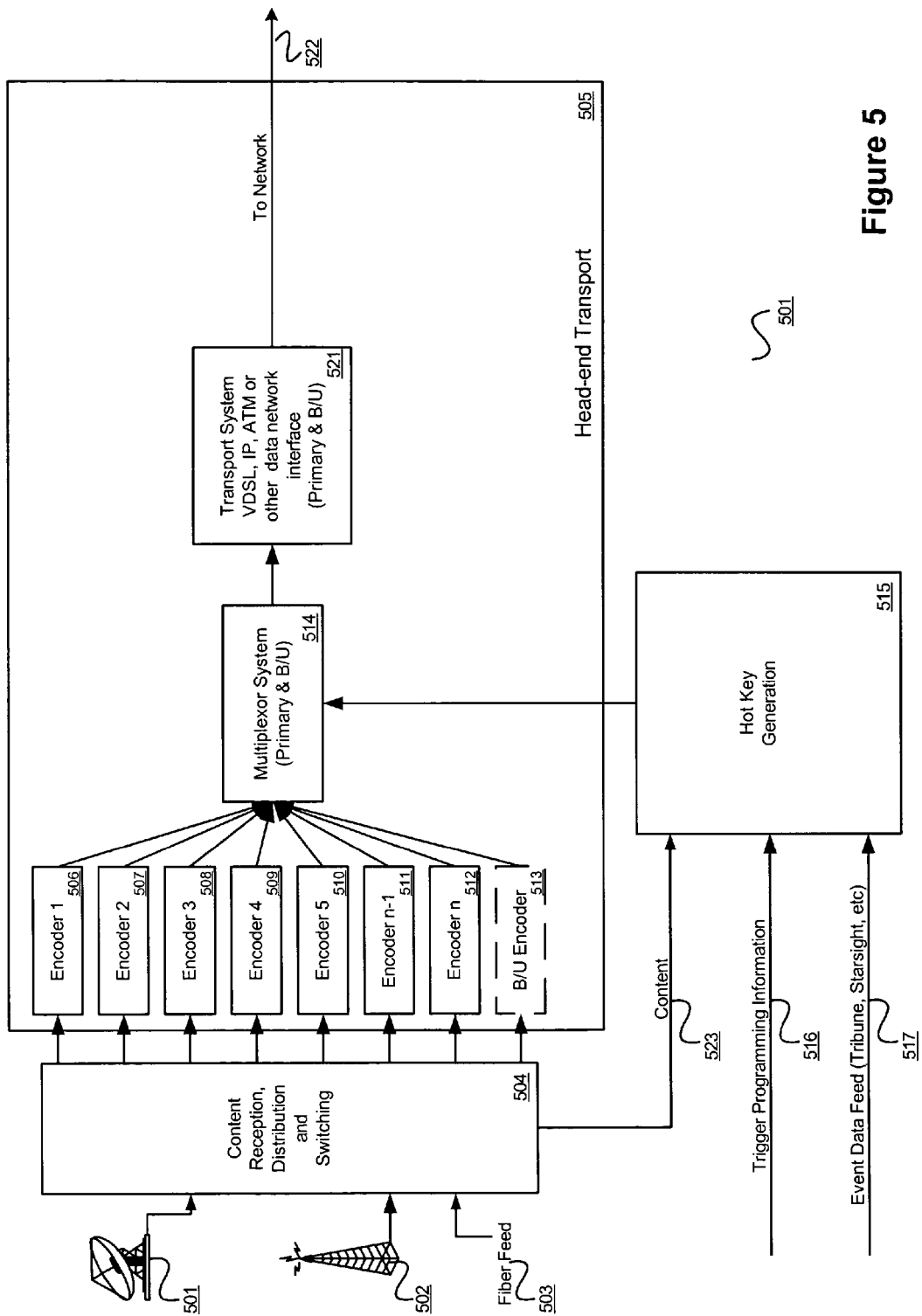
FIG. 5 is a block diagram of a head-end and data center system from which hot key signals may be generated and sent according to the embodiment illustrated in FIG. 2.

FIG. 5 is a block diagram illustrating a head-end and data center system from which hot key signals may be generated and sent according to the embodiment illustrated in FIG. 2. This example illustrates head-end and data center system 501 comprising content reception, distribution, and switching portion 504, head-end transport portion 505, and hot key generation system 515.

Content reception, distribution, and switching portion 504 is connected with one or more of satellite receiver 501, over the air broadcast receiver 502, fiber optical feed 503, and other types of links (not shown) to receive signals from one or more content providers. Content reception, distribution, and switching portion 504 comprises equipment that is commonly used to receive broadcast signals, demodulate the broadcast signals to separate the content signals from a carrier signal if necessary, distribute and arrange the content from the content providers to fit a programming schedule of the service provider, and provide switching of these signals between the various components of the head-end and data center 501.

Head-end transport portion 505 comprises a plurality of encoders 506-512, optional back-up encoder 513, multiplexor system 514, and transport system 521. Encoders 505-512 and optional back-up encoder 513 receive interactive TV content signals from content reception, distribution, and switching portion 504 and encode the content signals into any of a variety of well known formats such as Motion Pictures Experts Group Standard 2 (MPEG-2), Motion Pictures Experts Group Standard 4 (MPEG-4), DivX, or any other format. Encoders 505-512 and optional back-up encoder 513 each provide an individual encoded data stream representing the content signal of a single channel to multiplexor system 514.

Hot key generation system 515 is also connected with multiplexor system 514 of head-end transport 505. Hot key generation system 515 receives content 523 from content reception, distribution, and switching portion 504, trigger programming information 516, and event data feed 517. Trigger programming information 516 provides an indication of the time, date, etc. and an indication to generate a hot key signal. Event data feed 517 provides data related to content programming such as an Electronic Program Guide. Using content 523, trigger programming information 516, and event data feed 517 hot key generation system 515 generates hot key signals associated with content to be broadcast from head-end and data center 501 and outputs the hot key signals to mulitplexor system 514. Exemplary processes for generating hot key signals as may be performed by hot key generation system 515 will be discussed below with reference to FIG. 8.

Multiplexor system 514 may comprise a primary as well as an optional back-up multiplexor. Multiplexor system 514 combines the encoded content signals from encoders 505-512 and optional back-up encoder 513 and hot key signals from hot key generation system 515 to provide an output data stream. The output stream of multiplexor system 514 comprises the individual encoded data streams representing the content signals of the individual channels as well as any associated hot key signals.

The output of multiplexor system 514 may be applied to transport system 521 that may comprise a primary as well as an optional back-up transport system. The function of the transport system 521 is to prepare the output stream of multiplexor system 514 for transmission over network 522. That is, transport system 521 place the output stream of multiplexor system 514 into a format and protocol appropriate for network 522. The network may be any a variety of possible networks such as VDSL, IP, ATM, etc. For example, the output stream of multiplexor system may be placed into Internet Protocol (IP) packets or placed into an Asynchronous Transfer Mode (ATM) channel by transport system 521.

Figure 6:
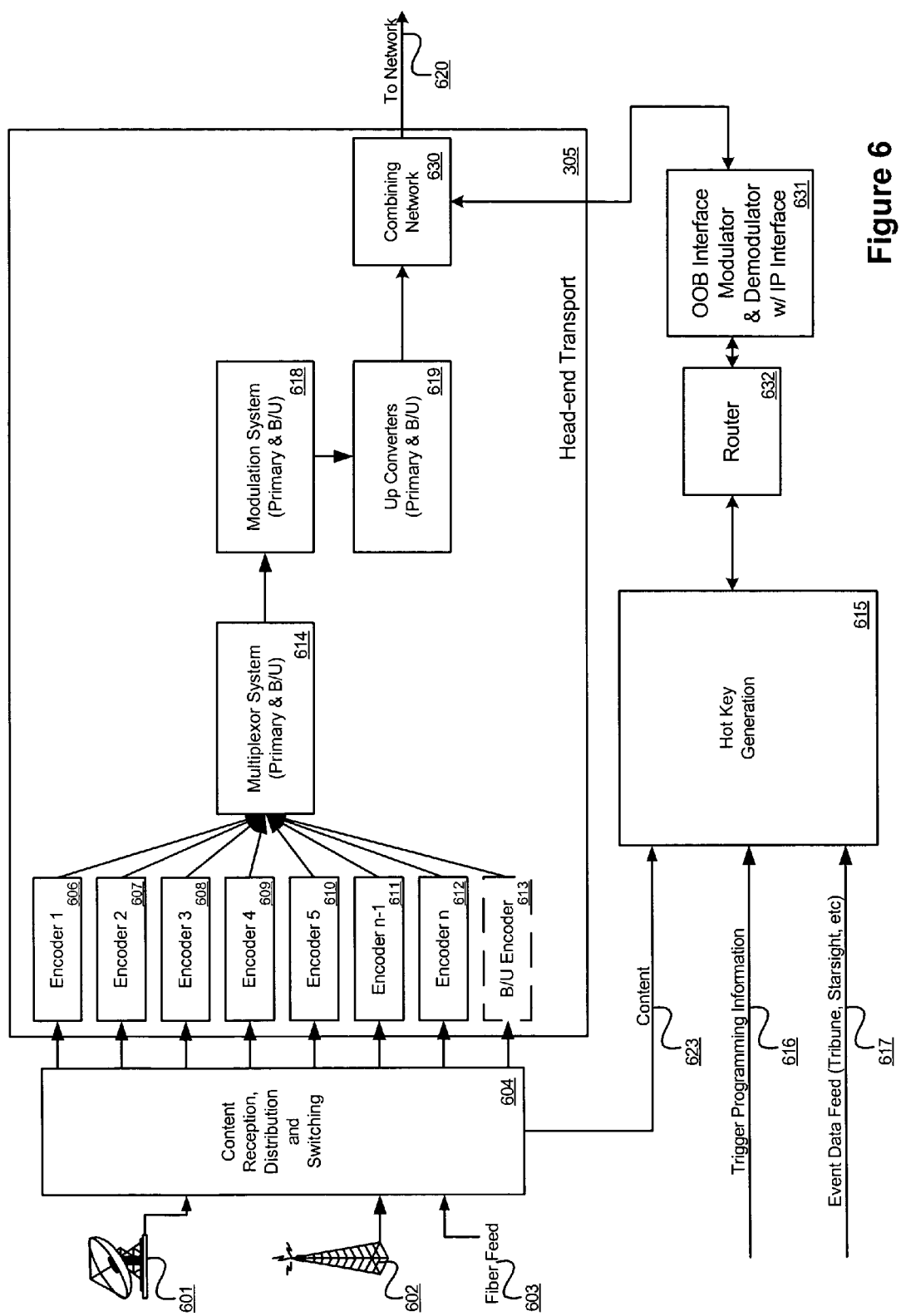
FIG. 6 is a block diagram of a head-end and data center system from which hot key signals may be generated and sent according to the embodiment illustrated in FIG. 3.

FIG. 6 is a block diagram of a head-end and data center system from which hot key signals may be generated and sent according to the embodiment illustrated in FIG. 3. This example illustrates head-end and data center system 601 comprising content reception, distribution, and switching portion 604, head-end transport portion 605, and hot key generation system 615.

Content reception, distribution, and switching portion 604 is connected with one or more of satellite receiver 601, over the air broadcast receiver 602, fiber optical feed 603, and other types of links (not shown) to receive signals from one or more content providers. Content reception, distribution, and switching portion 604 comprises equipment that is commonly used to receive broadcast signals, demodulate the broadcast signals to separate the content signals from a carrier signal if necessary, distribute and arrange the content from the content providers to fit a programming schedule of the service provider, and provide switching of these signals between the various components of the head-end and data center 601.

Head-end transport portion 605 comprises a plurality of encoders 606-612, optional back-up encoder 613, multiplexor system 614, modulation system 618, up converters 619 and combining network 630. Encoders 605-612 and optional back-up encoder 613 receive interactive TV content signals from content reception, distribution, and switching portion 604 and encode the content signals into any of a variety of well known formats such as Motion Pictures Experts Group Standard 2 (MPEG-2), Motion Pictures Experts Group Standard 4 (MPEG-4), DivX, or any other format. Encoders 605-612 and optional back-up encoder 613 each provide an individual encoded data stream representing the content signal of a single channel to multiplexor system 614.

Multiplexor system 614 may comprise a primary as well as an optional back-up multiplexor. Multiplexor system 614 combines the encoded content signals from encoders 605-612 and optional back-up encoder 613 to provide an output data stream. The output stream of multiplexor system 614 comprises the individual encoded data streams representing the content signals of the individual channels.

The output stream of multiplexor system 614 may be applied to a modulation system 618. Modulation system 618 may comprise a primary as well as an optional back-up modulator. Modulation system 618 uses the output data stream of multiplexor system 614 to modulate a carrier frequency for transmission from the head-end system 601.

Modulation system 618 supplies the modulated carrier signal to up converters 619. Up converters 619 may comprise primary as well as optional back-up converters. Additionally, up converters 619 may comprise multiple stages of converters. The function of up converters 619 is to increase the modulated carrier frequency to a range that is suitable for broadcast. Up converters 619 then transmit the modulated carrier signal from head-end and data center 601 via network 620 to subscribers.

Hot key generation system 615 receives content 623 from content reception, distribution, and switching portion 604, trigger programming information 616, and event data feed 617. Trigger programming information 616 provides an indication of the time, date, etc. and an indication to generate a hot key signal. Event data feed 617 provides data related to content programming such as an Electronic Program Guide. Using content 623, trigger programming information 616, and event data feed 617 hot key generation system 615 generates hot key signals associated with content to be broadcast from head-end and data center 601 and outputs the hot key signals to router 632. Exemplary processes for generating hot key signals as may be performed by hot key generation system 615 will be discussed below with reference to FIG. 8.

Router 632 directs the hot key signal to one or more subscribers connected with the head-end and data. That is, router 632 adds address or multicast information to the hot key signal indicating destinations for the hot key signal. Router 632 then sends the hot key signals to OOB interface 631. OOB interface 631 modulates the hot key signal for transmission over an out-of-band side channel to the two-way video network. For example, if the hot key signal is sent using an out-of-band signaling method such as STCE 55-1, SCTE 55-2, Digital Audio Visual Council (DAVIC), Data Over Cable Service Interface Specification (DOCSIS), or similar method, the OOB interface 631 may include a Quaternary Phase Shift Keying (QPSK) modulator and demodulator. OOB interface 631 sends the modulated signal to combining network 630. Combining network 630 combines the modulated video signals and the modulated hot key signals for transmission to one or more subscribers.

Figure 7:
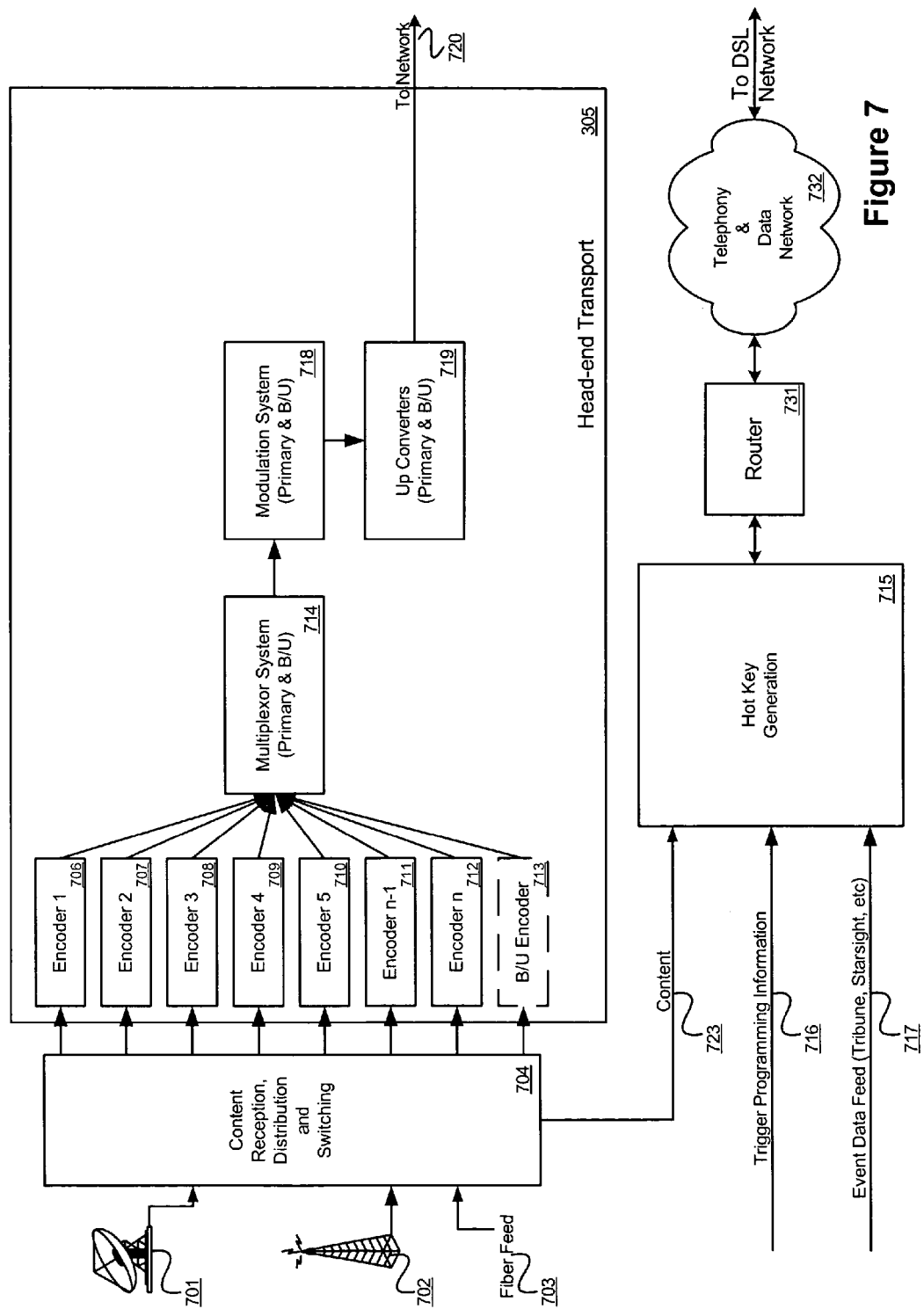
FIG. 7 is a block diagram of a head-end and data center system from which hot key signals may generated and sent according to the embodiment illustrated in FIG. 4.

FIG. 7 is a block diagram of a head-end and data center system from which hot key signals may be generated and sent according to the embodiment illustrated in FIG. 4. This example illustrates head-end and data center system 701 comprising content reception, distribution, and switching portion 704, head-end transport portion 705, and hot key generation system 715.

Content reception, distribution, and switching portion 704 is connected with one or more of satellite receiver 701, over the air broadcast receiver 702, fiber optical feed 703, and other types of links (not shown) to receive signals from one or more content providers. Content reception, distribution, and switching portion 704 comprises equipment that is commonly used to receive broadcast signals, demodulate the broadcast signals to separate the content signals from a carrier signal if necessary, distribute and arrange the content from the content providers to fit a programming schedule of the service provider, and provide switching of these signals between the various components of the head-end and data center 701.

Head-end transport portion 705 comprises a plurality of encoders 706-712, optional back-up encoder 713, multiplexor system 714, modulation system 718, and up converters 719. Encoders 705-712 and optional back-up encoder 713 receive interactive TV content signals from content reception, distribution, and switching portion 704 and encode the content signals into any of a variety of well known formats such as Motion Pictures Experts Group Standard 2 (MPEG-2), Motion Pictures Experts Group Standard 4 (MPEG-4), DivX, or any other format. Encoders 705-712 and optional back-up encoder 713 each provide an individual encoded data stream representing the content signal of a single channel to multiplexor system 714.

Multiplexor system 714 may comprise a primary as well as an optional back-up multiplexor. Multiplexor system 714 combines the encoded content signals from encoders 705-712 and optional back-up encoder 713 to provide an output data stream. The output stream of multiplexor system 714 comprises the individual encoded data streams representing the content signals of the individual channels.

The output stream of multiplexor system 714 may be applied to a modulation system 718. Modulation system 718 may comprise a primary as well as an optional back-up modulator. Modulation system 718 uses the output data stream of multiplexor system 714 to modulate a carrier frequency for transmission from the head-end system 701.

Modulation system 718 supplies the modulated carrier signal to up converters 719. Up converters 719 may comprise primary as well as optional back-up converters. Additionally, up converters 719 may comprise multiple stages of converters. The function of up converters 719 is to increase the modulated carrier frequency to a range that is suitable for broadcast. Up converters 719 then transmit the modulated carrier signal from head-end and data center 701 via network 720 to subscribers.

The one-way video network 720 may include a one-way cable network, a one-way satellite video network, or any other one-way network that may be used to deliver video content.

Hot key generation system 715 receives content 723 from content reception, distribution, and switching portion 704, trigger programming information 716, and event data feed 717. Trigger programming information 516 provides an indication of the time, date, etc. and an indication to generate a hot key signal. Event data feed 517 provides data related to content programming such as an Electronic Program Guide. Using content 723, trigger programming information 716, and event data feed 717 hot key generation system 715 generates hot key signals associated with content to be broadcast from head-end and data center 701 and outputs the hot key signals to router 731. Exemplary processes for generating hot key signals as may be performed by hot key generation system 715 will be discussed below with reference to FIG. 8.

Router 731 directs the hot key signal to one or more subscribers connected with the head-end and data via telephony and data network 732. That is, router 731 adds address or multicast information to the hot key signal indicating destinations for the hot key signal. Router 731 then sends the hot key signals to subscribers via telephone and data network 732.

Figure 8:
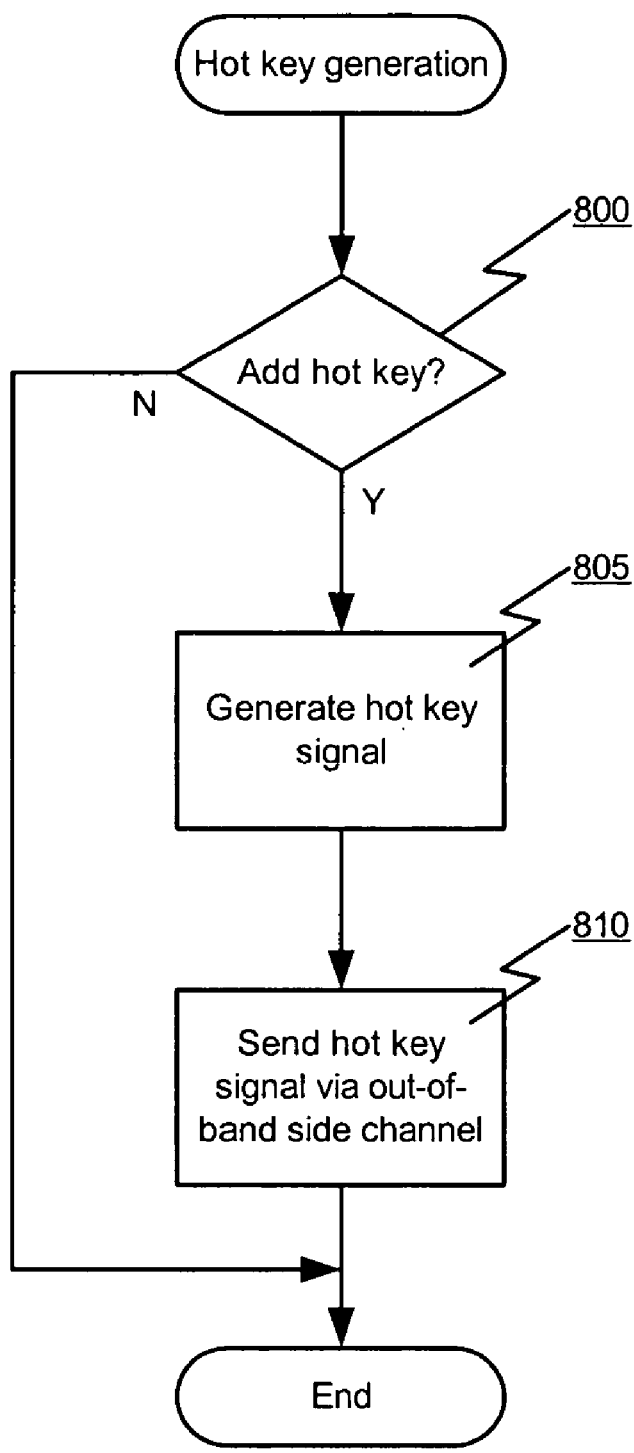
FIG. 8 is a flowchart illustrating head-end and data center processing for generating hot key signals according to another alternative embodiment of the present invention.

FIG. 8 is a flowchart illustrating head-end and data center processing for adding hot key signals to a broadcast signal according to one embodiment of the present invention. This process may be performed by a system such as the hot key generation system of the head-end and data center described above with reference to FIGS. 5-7 or any other system with similar capabilities.

First, at decision block 800, the system determines whether a hot key signal should be added to the current content. This determination may be made by a local television operator such as a decision to provide a hot key on a local advertisement that gives the subscriber the opportunity to find out more about a local product. Alternatively, this determination may be made by an original national content provider such as a national network to provide a hot key to all subscribers or to subscribers living in a certain state or region. An indication upon which this decision may be based may be passed in trigger information from the content provider to the head-end. Alternatively, the determination may be made at the head-end based on programming information or other information supplied by an operations team.

Figure 9:
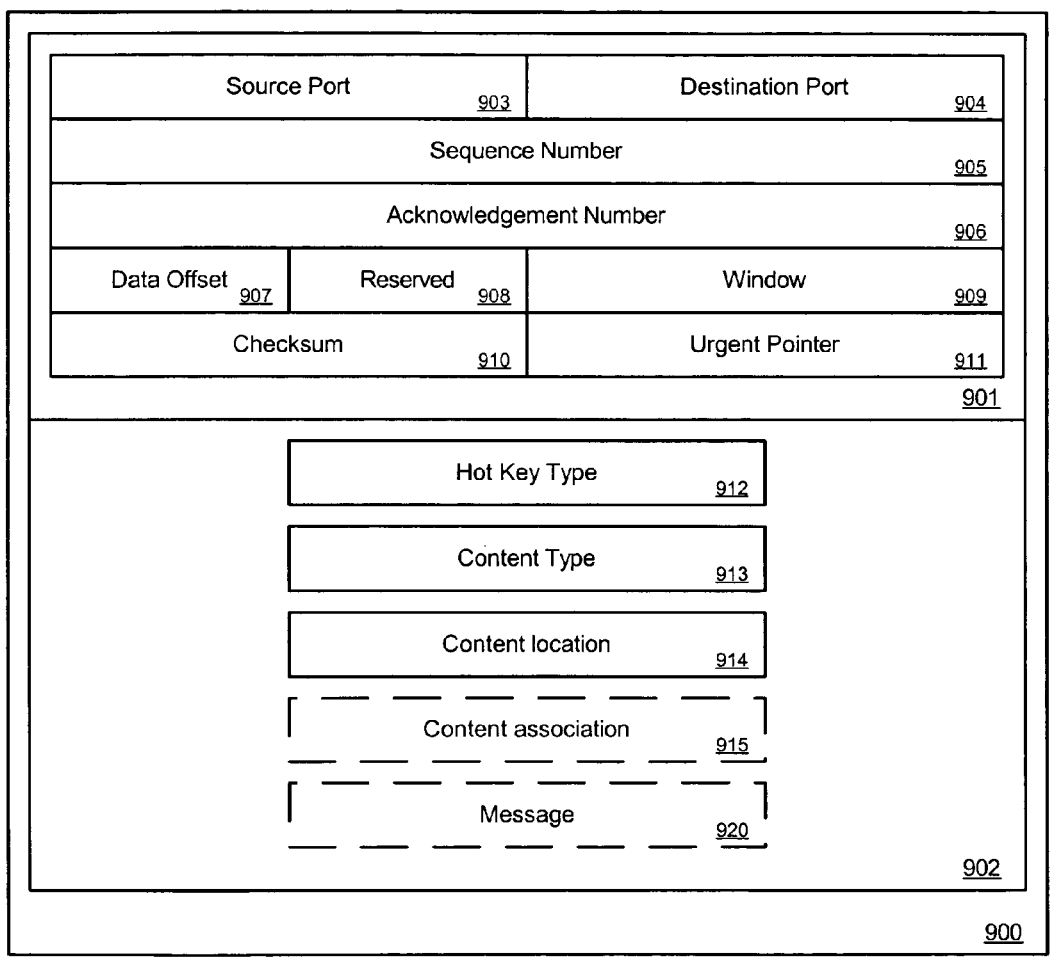
FIG. 9 is a diagram illustrating one possible format for a hot key data packet according to one embodiment of the present invention.

If a hot key signal is to be added to the current content, the hot key signal may be generated at processing block 805. As discussed below, the hot key signal may be in any of a variety of formats depending upon the system upon which the signals may be sent. An exemplary format is illustrated in FIG. 9 below. Generally, generating the hot key signal comprises generating information indicating a destination to which the signal should be sent, data associating the hot key with the content, and other possible information. The destination information may be multicast information or specific addresses from a database. The information associating the hot key with the content may be based on the trigger information initiating the generation of the hot key signal.

Finally, at processing block 805, the hot key signal is sent to one or more subscribers via an out-of-band side channel as described above. That is, the hot key IP packet or other signal is transmitted over a side-channel other than and out-of-band with the channel over which the content is transmitted as described above with reference to FIGS. 2-7. According to one embodiment of the present invention, the hot key signal may be generated and sent according to the out-of-band signaling methods described in the Society of Cable Telecommunications Engineers (STCE) standards STCE55-1, STCE55-2, or similar methods for out-of-band signaling.

FIG. 9 is a diagram illustrating one possible format for a hot key data packet according to one embodiment of the present invention. This example illustrates an IP data packet 900. The IP data packet includes a header 901 and a body 902.

Header 901 includes a number of fields 903-911 that are typically found in IP data packets. These fields include a source port 903, a destination port 904, a sequence number 905, an acknowledgement number 906, a data offset 907, a reserved field 908, a window field 909, checksum data 910, and an urgent pointer 911. It should be noted that such an IP data packet may be sent to multiple address using IP multicasting. Multicasting therefore allows efficient broadcasting of the hot key signals from the head-end and data center to subscribers.

Body 902 may also include a number of fields 912-920. These fields may include a hot key type 912, a content type 913, a content location 914, optional content association field 915 and optionally a message field 920. In various applications, the number of fields used, size of the fields, type of data presented, format of the data, content of the fields, etc. may vary. For example, in some cases not all of the fields presented here may be used. In other cases, additional data may be presented such as additional graphical or textual information. Additionally, the data may be presented in a wide variety of formats such as plain American Standard Code for Information Interchange (ASCII) text, other binary representations or even encrypted.

Regardless of format, hot key type field 912 may represent the type of hot key signal being used. For example, the hot key signal represented by IP data packet 900 may indicate that alternate content is available on another channel or on a web site. Alternatively, the hot key signal may indicate that alternate content is available to be cached on the subscriber's terminal device.

Content type field 913 may represent the type, genre, or other details about the alternate content. For example, this field 913 may be used to indicate that the alternate content is a sporting event or movie. Of course, additional details may also be included. For example, the field 913 may indicate that the alternate content is an action movie and name the actors and director. This information may be used by the subscriber's terminal device to judge the relevance of the hot key signal to the subscriber as will be discussed below.

Content location field 914 may indicate where the alternate content is located. For example, this field 914 may indicate another channel, a web site URL or indicate that the content has been cached on the subscriber's terminal device.

Optional content association field 915 may contain information relating the hot key signal to specific content. For example, the content association field 915 may indicate a channel to which the hot key signal is related and possibly a time during which the hot key signal is active. In this way, a hot key signal sent via an out-of-band side channel can be sent asynchronously with the content.

Optional message field 920 may include additional textual or graphical information regarding the hot key or the alternate content. For example, the message field 920 may contain a text message to be displayed to the subscriber providing details of the alternate content. This message may be presented to the subscriber automatically or at his option to help the subscriber decide whether to accept or decline the hot key.

Alternatively, the hot key signal may be generated in a variety of other formats for use in a variety of different systems. For example, rather than generating a specialized IP packet for the hot key signal, hot key information may be added to an MPEG data stream. In another example, the hot key signal may be added to an NTSC or HDTV signal prior to encoding.

Figure 10:
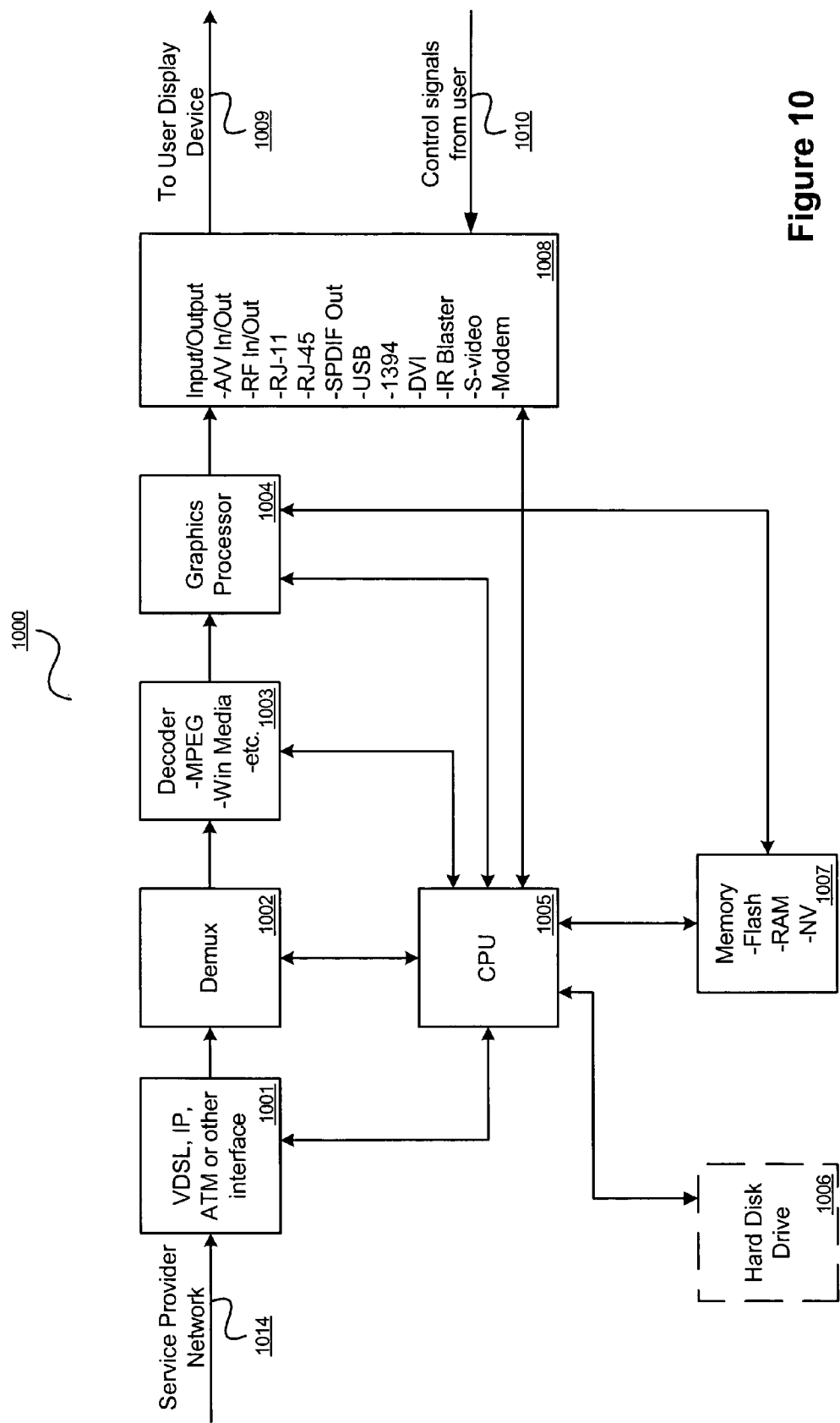
FIG. 10 is a block diagram of a subscriber side system to redirect a subscriber to alternate content responsive to selection of a hot key according to the embodiment illustrated in FIG. 2.

FIG. 10 is a block diagram illustrating a subscriber side system to redirect a subscriber to alternate content responsive to selection of a hot key according to the embodiment illustrated in FIG. 2. As discussed above, the subscriber side system may vary significantly. The subscriber side system comprising a terminal device, STB, Gateway or similar device, performs functions such as exchanging messages (including video-related data) over a network with head-end and data center, receiving messages from a user input device, such as a hand-held remote control unit, translating video signals from a network-native format into a format that can be used by televisions or other display devices, providing a video signal to televisions or other display devices, and other functions.

The functionality of the subscriber side system may reside in a stand-alone device, literally a box that can be placed on, or at least near, the television, that is similar in outward form to conventional devices for receiving cable programs. The subscriber side system functionality could alternatively be performed by hardware resident elsewhere, such as within the television or display console, or by any suitably equipped terminal device. Since the hardware may be proprietary to the service provider and may generally be a physically independent device, the term set top box is used here, but any type of terminal device with similar functionality may be used.

In the example illustrated in FIG. 10, the subscriber side system comprises an STB. The STB comprises interface 1001, demultiplexor 1002, decoder 1003, graphics processor 1004, central processing unit (CPU) 1005, optional hard disk drive 1006 or other mass storage device, memory 1007, and various possible inputs and outputs 1008.

Interface 1001 receives signals from the service provider network 1004 over any of a variety of media as discussed above. Interface 1001 is an interface suitable for communicating via the service provider's network 1014. Since the service provider's network may be a variety of different types, the interface may be a VDSL, IP, ATM, or other type of interface depending upon the network type used.

Demultiplexor 1002 receives the content signals from interface 1001 and separates the content into multiple data streams representing various channels. The multiple data streams are then supplied as an input to decoder 1003.

Decoder 1003 receives the multiple data streams from demultiplexor 1002 and decodes or decompresses the data streams using an appropriate algorithm. For example, if the head-end and data center compressed the video signals into an MPEG-2 data stream, decoder 1003 will decode the MPEG-2 data stream from demultiplexor 1002 to form a standard video signal. The video signal from decoder 1003 is then supplied to graphics processor 1004.

Graphics processor 1004 receives the decoded video signals from decoder 1003 and processes the video signals to reduce noise, provide amplifications, etc. Processed video signals from graphics processor 1004 are supplied to input/output module 1008. Input/output module 1008 may provide a variety of possible output types. For example, outputs may include but are not limited to Audio/Video (A/V), Radio Frequency (RF), Sony/Phillips Digital Interface (SPDIF), Universal Serial Bus (USB), and others.

Input/output module 1008 also receives control signals from the subscriber. These control signals are typically Infra-Red (IR) or Radio Frequency (RF) signals from a remote control unit. Control signals from the subscriber are then fed back from input/output module 1008 to Central Processing Unit (CPU) 1005.

CPU 1005 executes instructions stored in memory 1007. Memory 1007 may comprise a Random Access Memory (RAM) such as flash memory, or other non-volatile memory. The instructions stored in memory 1007, when executed by CPU 1005 cause CPU 1005 to perform various functions such as controlling the various elements of the STB, receiving hot key signals, and switching to alternate content as will be described below with reference to FIG. 13.

Generally, a hot key signal will be received at interface 1001 along with content signals from the head-end and data center and transmitted over service provider network 1004. CPU 1005 monitors the data streams passing through interface 1001 for the presence of relevant hot key signals.

The STB may also contain an optional hard disk drive 1006 or other mass storage device. Hard disk drive 1006 allows the STB to cache alternate content for later viewing by the subscriber. If CPU 1005 detects a hot key signals instructing content to be cached, the demultiplexed data stream from demultiplexor 1002 may be saved on hard disk drive 1006. The still compressed content is stored on hard disk drive 1006 until the subscriber chooses to view it. Once the subscriber chooses to view the cached content, CPU 1005 may retrieve the content from hard disk drive 1006 and provide the compressed data stream to be decoded by decoder 1003, processed by graphics processor 1004, and output through input/output module 1008.

Figure 11:
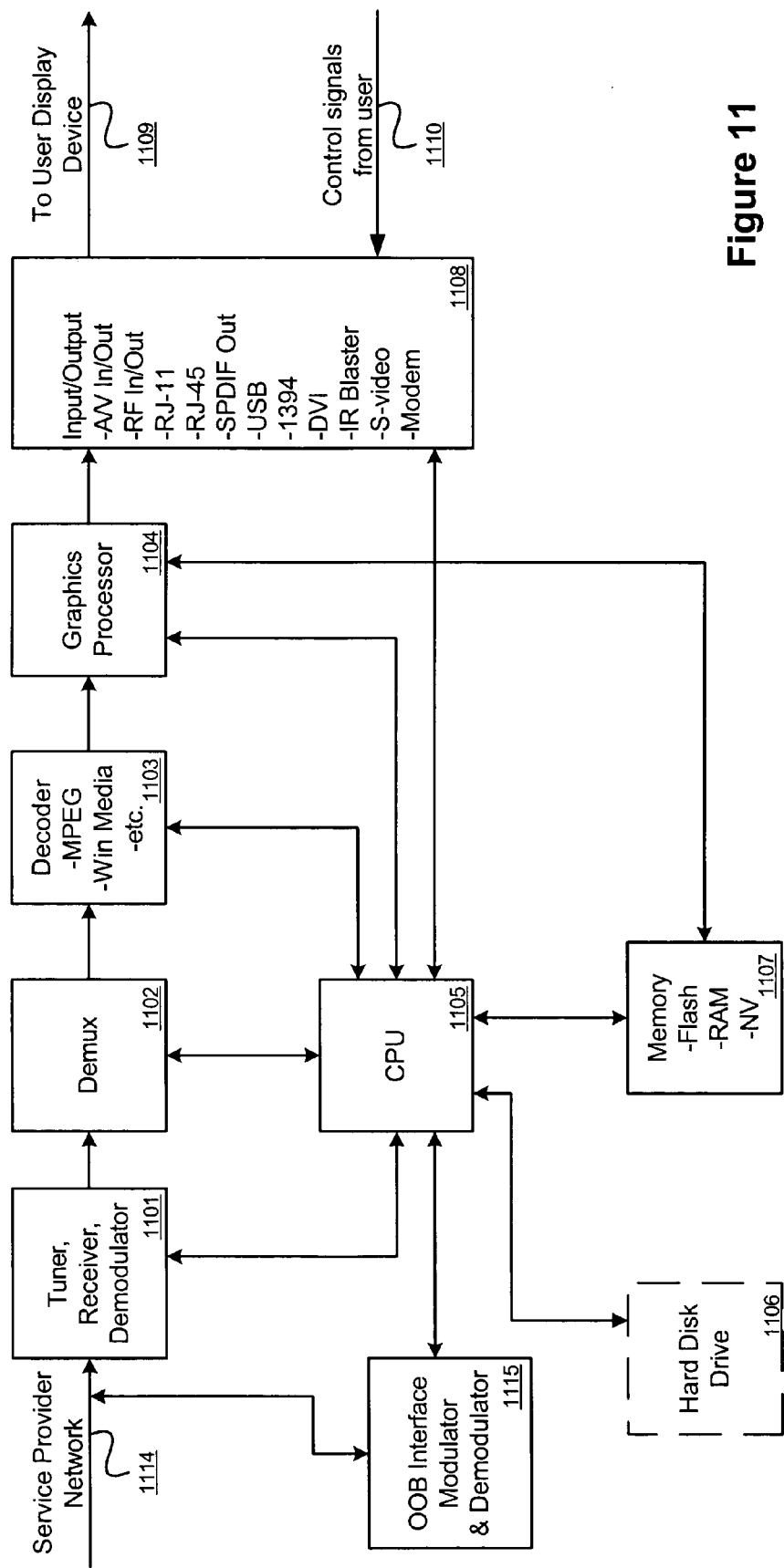
FIG. 11 is a block diagram of a subscriber side system to redirect a subscriber to alternate content responsive to selection of a hot key according to the embodiment illustrated in FIG. 3.

FIG. 11 is a block diagram of a subscriber side system to redirect a subscriber to alternate content responsive to selection of a hot key according to the embodiment illustrated in FIG. 3. As discussed above, the subscriber side system may vary significantly. The subscriber side system comprising a terminal device, STB, Gateway or similar device, performs functions such as exchanging messages (including video-related data) over a network with head-end and data center, receiving messages from a user input device, such as a hand-held remote control unit, translating video signals from a network-native format into a format that can be used by televisions or other display devices, providing a video signal to televisions or other display devices, and other functions.

The functionality of the subscriber side system may reside in a stand-alone device, literally a box that can be placed on, or at least near, the television, that is similar in outward form to conventional devices for receiving cable programs. The subscriber side system functionality could alternatively be performed by hardware resident elsewhere, such as within the television or display console, or by any suitably equipped terminal device. Since the hardware may be proprietary to the service provider and may generally be a physically independent device, the term set top box is used here, but any type of terminal device with similar functionality may be used.

In the example illustrated in FIG. 11, the subscriber side system comprises an STB. The STB comprises tuner, receiver, demodulator 1101, demultiplexor 1102, decoder 1103, graphics processor 1104, central processing unit (CPU) 1105, optional hard disk drive 1106 or other mass storage device, memory 1107, OOB interface 1115, and various possible inputs and outputs 1108.

Tuner, receiver, demodulator 1101 receives signals from the service provider network 1114 over any of a variety of media as discussed above. Specifically, tuner, receiver, demodulator 1101 receives signals of a frequency band to which it is tuned and demodulates the signals to remove content signals from a carrier signal if any. Demodulated content signals are then supplied by tuner, receiver, demodulator 1101 to demultiplexor 1102.

Demultiplexor 1102 receives the demodulated content signals from tuner, receiver, demodulator 1101 and separates the content into multiple data streams representing various channels. The multiple data streams are then supplied as an input to decoder 1103.

Decoder 1103 receives the multiple data streams from demultiplexor 1102 and decodes or decompresses the data streams using an appropriate algorithm. For example, if the head-end and data center compressed the video signals into an MPEG-2 data stream, decoder 1103 will decode the MPEG-2 data stream from demultiplexor 1102 to form a standard video signal. The video signal from decoder 1103 is then supplied to graphics processor 1104.

Graphics processor 1104 receives the decoded video signals from decoder 1103 and processes the video signals to reduce noise, provide amplifications, etc. Processed video signals from graphics processor 1104 are supplied to input/output module 1108. Input/output module 1108 may provide a variety of possible output types. For example, outputs may include but are not limited to Audio/Video (A/V), Radio Frequency (RF), Sony/Phillips Digital Interface (SPDIF), Universal Serial Bus (USB), and others.

Input/output module 1108 also receives control signals from the subscriber. These control signals are typically Infra-Red (IR) or Radio Frequency (RF) signals from a remote control unit. Control signals from the subscriber are then fed back from input/output module 1108 to Central Processing Unit (CPU) 1105.

OOB interface modulator and demodulator 1115 is also connected with and receives signals from the service provider via a side channel out-of-band with the content. OOB interface 1115 contains modulators and demodulators appropriate for sending and receiving signals according to the standards used by the head-end and data center for sending hot key signals. For example, if the hot key signal is sent using an out-of-band signaling method such as STCE 55-1, SCTE 55-2, Digital Audio Visual Council (DAVIC), Data Over Cable Service Interface Specification (DOCSIS), or similar method, the OOB interface 1115 may include a Quaternary Phase Shift Keying (QPSK) modulator and demodulator. OOB interface modulator and demodulator 1115 receives, demodulates and detects any hot key signals sent to the STB via the out-of-band side channel of the service provider's network 1114.

CPU 1105 executes instructions stored in memory 1107. Memory 1107 may comprise a Random Access Memory (RAM) such as flash memory, or other non-volatile memory. The instructions stored in memory 1107, when executed by CPU 1105 cause CPU 1105 to perform various functions such as controlling the various elements of the STB, receiving hot key signals, and switching to alternate content as will be described below with reference to FIG. 13.

The STB may also contain an optional hard disk drive 1106 or other mass storage device. Hard disk drive 1106 allows the STB to cache alternate content for later viewing by the subscriber. If CPU 1105 detects a hot key signals instructing content to be cached, the demultiplexed data stream from demultiplexor 1102 may be saved on hard disk drive 1106. The still compressed content is stored on hard disk drive 1106 until the subscriber chooses to view it. Once the subscriber chooses to view the cached content, CPU 1105 may retrieve the content from hard disk drive 1106 and provide the compressed data stream to be decoded by decoder 1103, processed by graphics processor 1104, and output through input/output module 1108.

Figure 12:
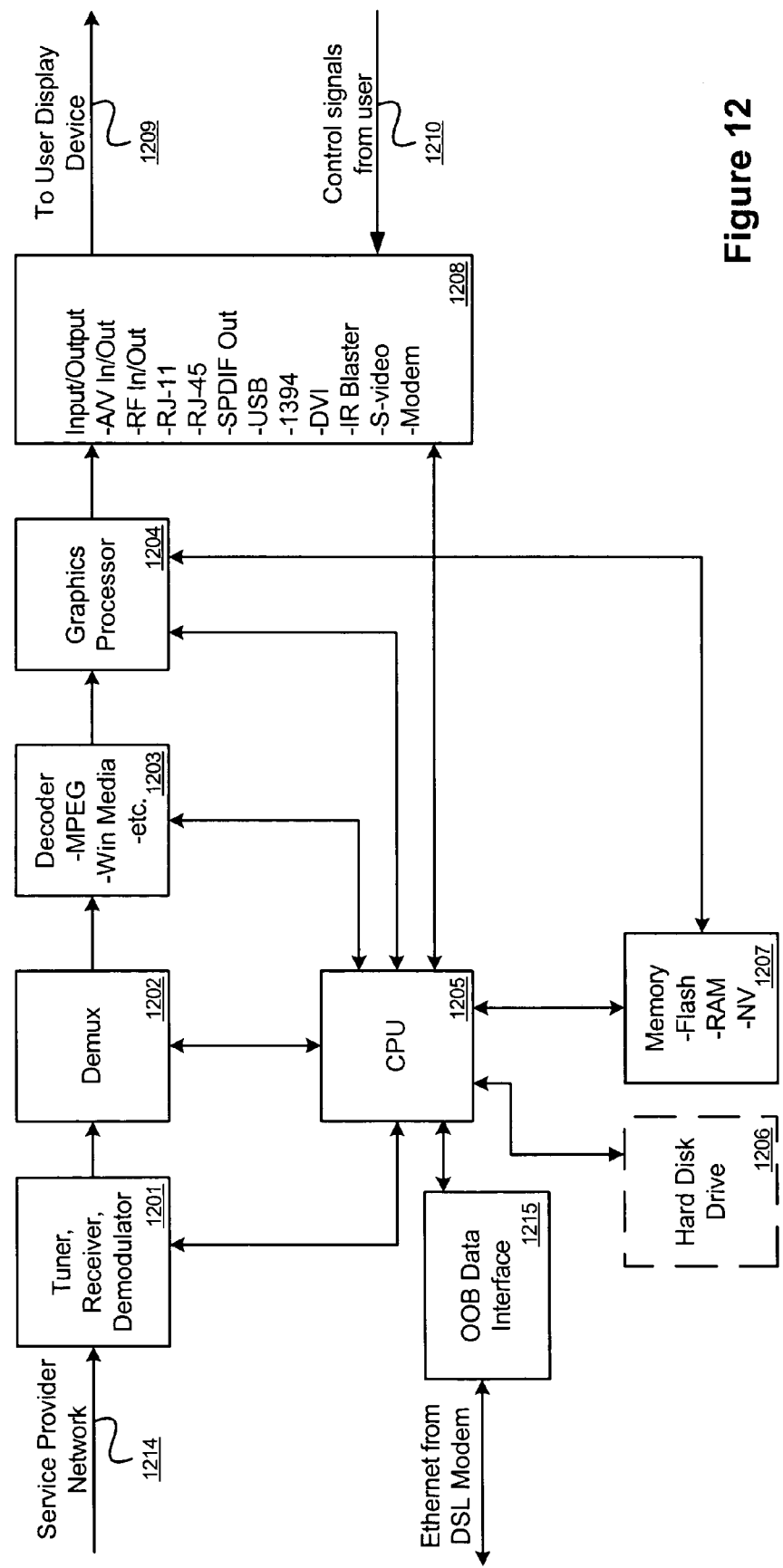
FIG. 12 is a block diagram of a subscriber side system to redirect a subscriber to alternate content responsive to selection of a hot key according to the embodiment illustrated in FIG. 4.

FIG. 12 is a block diagram of a subscriber side system to redirect a subscriber to alternate content responsive to selection of a hot key according to the embodiment illustrated in FIG. 4. As discussed above, the subscriber side system may vary significantly. The subscriber side system comprising a terminal device, STB, Gateway or similar device, performs functions such as exchanging messages (including video-related data) over a network with head-end and data center, receiving messages from a user input device, such as a hand-held remote control unit, translating video signals from a network-native format into a format that can be used by televisions or other display devices, providing a video signal to televisions or other display devices, and other functions.

The functionality of the subscriber side system may reside in a stand-alone device, literally a box that can be placed on, or at least near, the television, that is similar in outward form to conventional devices for receiving cable programs. The subscriber side system functionality could alternatively be performed by hardware resident elsewhere, such as within the television or display console, or by any suitably equipped terminal device. Since the hardware may be proprietary to the service provider and may generally be a physically independent device, the term set top box is used here, but any type of terminal device with similar functionality may be used.

In the example illustrated in FIG. 12, the subscriber side system comprises an STB. The STB comprises tuner, receiver, demodulator 1201, demultiplexor 1202, decoder 1203, graphics processor 1204, central processing unit (CPU) 1205, OOB data interface 1215, optional hard disk drive 1206 or other mass storage device, memory 1207, and various possible inputs and outputs 1208.

Tuner, receiver, demodulator 1201 receives signals from the service provider network 1204 over any of a variety of media as discussed above. Specifically, tuner, receiver, demodulator 1201 receives signals of a frequency band to which it is tuned and demodulates the signals to remove content signals from a carrier signal if any. Demodulated content signals are then supplied by tuner, receiver, demodulator 1201 to demultiplexor 1202.

Demultiplexor 1202 receives the demodulated content signals from tuner, receiver, demodulator 1201 and separates the content into multiple data streams representing various channels. The multiple data streams are then supplied as an input to decoder 1203.

Decoder 1203 receives the multiple data streams from demultiplexor 1202 and decodes or decompresses the data streams using an appropriate algorithm. For example, if the head-end and data center compressed the video signals into an MPEG-2 data stream, decoder 1203 will decode the MPEG-2 data stream from demultiplexor 1202 to form a standard video signal. The video signal from decoder 1203 is then supplied to graphics processor 1204.

Graphics processor 1204 receives the decoded video signals from decoder 1203 and processes the video signals to reduce noise, provide amplifications, etc. Processed video signals from graphics processor 1204 are supplied to input/output module 1208. Input/output module 1208 may provide a variety of possible output types. For example, outputs may include but are not limited to Audio/Video (A/V), Radio Frequency (RF), Sony/Phillips Digital Interface (SPDIF), Universal Serial Bus (USB), and others.

Input/output module 1208 also receives control signals from the subscriber. These control signals are typically Infra-Red (IR) or Radio Frequency (RF) signals from a remote control unit. Control signals from the subscriber are then fed back from input/output module 1208 to Central Processing Unit (CPU) 1205.

OOB data interface 1215 is connected with and receives signals from the service provider via a separate network such as the telephony network described above with reference to FIG. 4. OOB data interface 1215 receives and detects any hot key signals sent to the STB via the out-of-band side channel of the service provider's network.

CPU 1205 executes instructions stored in memory 1207. Memory 1207 may comprise A Random Access Memory (RAM) such as flash memory, or other non-volatile memory. The instructions stored in memory 1207, when executed by CPU 1205 cause CPU 1205 to perform various functions such as controlling the various elements of STB 1208, receiving hot key signals, and switching to alternate content as will be described below with reference to FIG. 13. Generally, a hot key signal will be received by OOB data interface 1215 from the head-end and data center and transmitted over service provider network 1204. CPU 1205 monitors the demultiplexed data streams from demultiplexor 1202 for the presence of relevant hot key signals.

STB 1208 may also contain an optional hard disk drive 1206 or other mass storage device. Hard disk drive 1206 allows STB 1208 to cache alternate content for later viewing by the subscriber. If CPU 1205 detects a hot key signals instructing content to be cached, the demultiplexed data stream from demultiplexor 1202 may be saved on hard disk drive 1206. The still compressed content is stored on hard disk drive 1206 until the subscriber chooses to view it. Once the subscriber chooses to view the cached content, CPU 1205 may retrieve the content from hard disk drive 1206 and provide the compressed data stream to be decoded by decoder 1203, processed by graphics processor 1204, and output through input/output module 1208.

Figure 13:
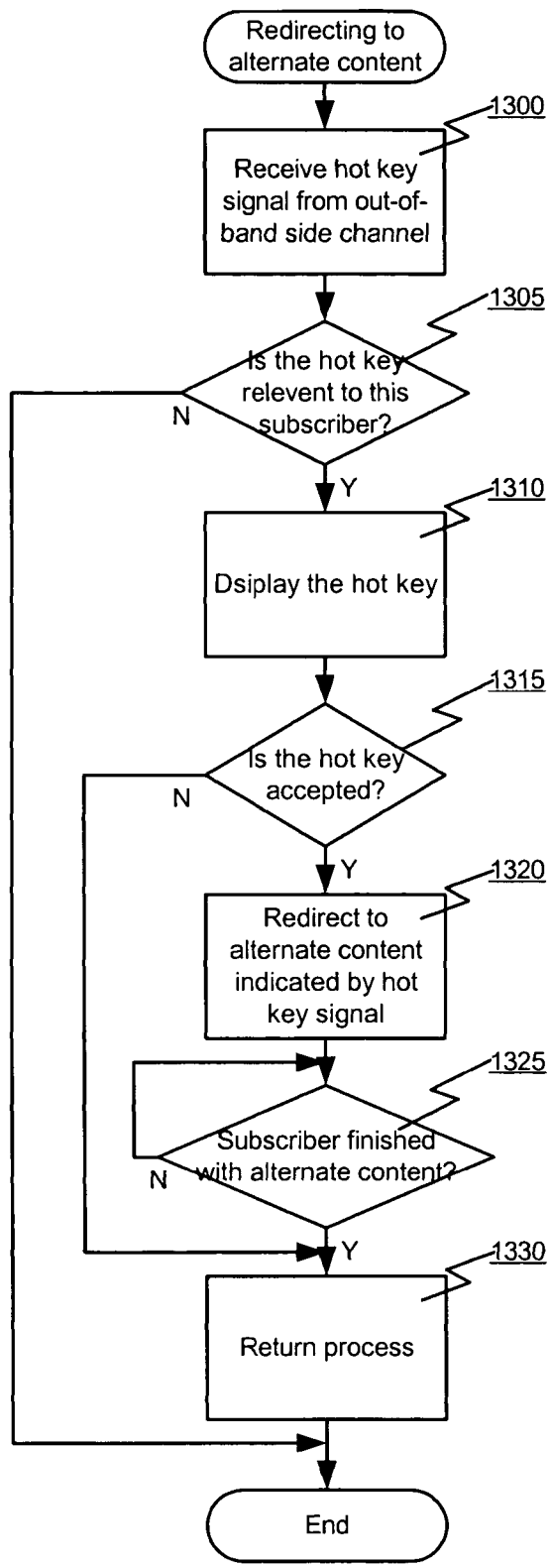
FIG. 13 is a flowchart illustrating processing on a subscriber side system for redirecting a subscriber to alternate content responsive to selection of a hot key according to one embodiment of the present invention.

FIG. 13 is a flowchart illustrating processing on a subscriber side system for redirecting a subscriber to alternate content responsive to selection of a hot key according to one embodiment of the present invention. This process may be performed by a system such as described above with reference to FIGS. 10 through 12 or any other system with similar capabilities.

First, at processing block 1300, the system receives a hot key signal from the service provider via the out-of-band side channel. As discussed above, the hot key signal may be in the form of a specialized IP packet or another type of signal from the service provider. According to one embodiment of the present invention, the hot key signal may be sent from the head-end and data scenter according to the out-of-band signaling methods described in the Society of Cable Telecommunications Engineers (STCE) standards STCE55-1, STCE55-2, or similar methods for out-of-band signaling.

At decision block 1305 a determination is made as to whether the hot key signal is relevant to the particular subscriber. Since numerous hot key signals may be broadcast at any particular time, the signals may be filtered before being presented to the subscriber. Such filtering may be based on any number of possible algorithms and criteria. For example, only hot key signals related to a channel that is presently being viewed may be considered relevant. As discussed above, a hot key signal may be related or associated with a given channel via a field in the hot key signal data. Another criteria for determining relevance of a hot key signal may be choices of content types or genres which have been selected by the subscriber. Regardless of the algorithm or criteria used to judge relevance, if the hot key signal is determined at decision block 1305 to not be relevant, no further processing is performed.

If the hot key signal is determined at decision block 1305 to be relevant to the subscriber, a hot key icon or other indication is displayed to the subscriber at processing block 1310. As mentioned above, this indication may be in the form of an icon placed on the screen, a text message, a tone or even a verbal alert. Regardless of the exact form, some indication is given to the subscriber that a hot key has been received.

At decision block 1315 a determination is made as to whether the subscriber has accepted the hot key. As discussed above, the subscriber may use any of a variety of means to indicate acceptance of the hot key. For example, different single or even multiple buttons on a remote control may be pressed by the subscriber to accept or decline the alternate content. According to one embodiment, a single "hot key button" may be present on the subscriber's remote control that may be pressed by the subscriber whenever a hot key icon is present on the television display. Regardless of the exact means of accepting or declining the hot key, if it is determined at decision block 1315 the subscriber did not accept the hot key, no further processing is performed.

If, at decision block 1315, the subscriber accepts the hot key, the subscriber is redirected to the alternate content at processing block 1320.

At decision block 1325 a determination is made as to whether the subscriber has finished consuming the alternate content. This determination may be based on any of a variety of possible criteria. For example, the subscriber may press a button or series of buttons on a remote control to indicate that he has finished viewing the presented material. Alternatively, the subscriber may use a mouse or other pointing device of a remote control to select a graphic on the display to indicate that he has finished viewing the presented material.

Once a determination is made at decision block 1325 that the subscriber is finished with the alternate content, a return process is entered at processing block 1330. This return process may include simply returning the subscriber to the previous content. Alternatively, the return process may comprise presenting to the subscriber other available content based on other hot key signals. Another alternative may include presenting a subscriber with a number of choices of how to proceed.

What is claimed is:

1. A method comprising:
   receiving, at a head-end, an event data feed, content to be provided to a particular subscriber, and trigger programming information;
   creating, at the head-end, an indicator configured to provide to a subscriber side system an indication of an availability of alternate content, wherein the indicator is created based on the event data feed, the content, and the trigger programming information; and
   determining, at the head-end, whether to send the indicator and the content to the subscriber side system, wherein sending the indicator and the content includes sending the indicator and the content separately to the subscriber side system over different networks;
   wherein the indicator includes information that enables the subscriber side system to:
      determine a relevance of the alternate content to the particular subscriber; and
      determine, based at least in part on the relevance, whether to present a selectable option that enables access by the particular subscriber to the alternate content.

2. The method of claim 1, wherein the indicator is created exclusively based on the event data feed, the content, and the trigger programming information.

3. The method of claim 1, wherein the alternate content is associated with programming offered by a content provider at a particular date and a particular time via a particular channel.

4. The method of claim 1, wherein the information specifies a particular genre associated with the alternate content.

5. The method of claim 1, wherein the indicator comprises a data packet and wherein the information includes channel data specifying a particular channel associated with the indicator, the channel data stored in a content association field within the data packet.

6. The method of claim 1, wherein the information specifies a particular time period during which the alternate content is available to the particular subscriber.

7. The method of claim 1, wherein the relevance is determined based at least in part on a comparison of the information to first content being provided to the particular subscriber.

8. The method of claim 1, wherein the relevance is determined based at least in part on a comparison of the information to a selection of a preferred genre, the selection received from the particular subscriber.

9. The method of claim 1, wherein a determination of whether to send the indicator to the subscriber side system is based at least in part on a geographical location associated with the particular subscriber.

10. The method of claim 1, wherein the indication of the availability of alternate content includes an indication of an available pay-per-view event, wherein the relevance is determined based at least in part on a comparison of the information to second content being displayed to the particular subscriber via the subscriber side system.

11. The method of claim 1, wherein the indicator is sent when a provider associated with the alternate content purchases the indicator.

12. The method of claim 10, wherein the indicator further includes information that enables the subscriber side system to present the selectable option, wherein the selectable option is presented independent of a user request, and wherein the selectable option enables access directly to the pay-per-view event.

13. The method of claim 1, wherein the indicator comprises a data packet, the data packet having a header portion and a body portion, the body portion having a plurality of fields, wherein each of the plurality of fields includes data corresponding to at least one of a content type of the alternate content and a content location of the alternate content.

14. The method of claim 13, wherein the data included in at least one of the plurality of fields comprises the information.

15. The method of claim 13, further comprising encrypting the body portion independent of the header portion.

16. The method of claim 13, wherein the plurality of fields includes an indicator type field, a content type field, a content location field, a content association field, and a message field.

17. The method of claim 1, further comprising:
   sending the indicator over a first network to the subscriber side system; and
   transmitting the content over a second network to the subscriber side system, wherein the second network is distinct from the first network, and wherein the content is transmitted concurrently with sending the indicator.

18. The method of claim 17, further comprising encrypting the information included in the indicator prior to sending the indicator over the first network.

19. The method of claim 18, wherein the first network includes a data network.

20. The method of claim 19, wherein the content is transmitted over a digital subscriber line.

21. The method of claim 19, wherein the second network is a one-way video network.

22. The method of claim 21, wherein the one-way video network is a one-way cable network.

23. An apparatus comprising:
a processor in a head-end that supports a subscriber side system, the processor configured to:
receive an event data feed, content to be provided to a particular subscriber, and trigger programming information;
create an indicator based on the event data feed, the content, and the trigger programming information; and
determine whether to send the indicator and the content to the subscriber side system, wherein sending the indicator and the content includes sending the indicator and the content separately to the subscriber side system over different networks, and wherein the indicator is configured to provide to the subscriber side system an indication of an availability of alternate content;
wherein the indicator includes information enabling the subscriber side system to:
determine a relevance of the alternate content to the particular subscriber, and
determine, based at least in part on the relevance, whether to present to the particular subscriber a selectable option that enables access by the particular subscriber to the alternate content.

24. The apparatus of claim 23, wherein the information is encrypted.

25. The apparatus of claim 23, wherein the indicator is sent over a first network to the subscriber side system and content is transmitted to the subscriber side system concurrently over a second network, wherein the second network is distinct from the first network.

26. The apparatus of claim 25, wherein the first network includes a digital subscriber line and wherein the second network includes a coaxial cable.

27. A non-transitory computer-readable storage medium including computer executable instructions that, when executed by a processor, cause the processor to:
receive, at a head-end, an event data feed, content to be provided to a particular subscriber, and trigger programming information;
determine, at the head-end, whether to send an indicator and the content to a subscriber side system, wherein sending the indicator and the content includes sending the indicator and the content separately to the subscriber side system over different networks, and wherein the indicator is configured to provide to the subscriber side system an indication of an availability of alternate content; and
create, at the head-end, the indicator in response to determining to send the indicator to the subscriber side system, wherein the indicator is created based on the event data feed, the content, and the trigger programming information, and wherein the indicator includes information to:
enable a determination of a relevance of the alternate content to the particular subscriber; and
enable a determination, based at least in part on the relevance, whether to present to the particular subscriber a selectable option that enables access by the particular subscriber to the alternate content.

28. The non-transitory computer-readable storage medium of claim 27, further comprising computer executable instructions that when executed by the processor, cause the processor to send the indicator to the subscriber side system via a side channel, wherein the side channel is out-of-band with respect to a channel used to send particular content to the subscriber side system.

29. The non-transitory computer-readable storage medium of claim 27, wherein a determination of whether to send the indicator to the subscriber side system is based in part on the trigger programming information, wherein the trigger programming information is provided by a content provider.

* * * * *